(12) United States Patent
Nakata

(10) Patent No.: US 11,840,217 B2
(45) Date of Patent: Dec. 12, 2023

(54) AUTONOMOUS DRIVE INSTRUCTION DEVICE AND AUTONOMOUS DRIVE INSTRUCTION METHOD

(71) Applicant: Mitsubishi Electric Corporation, Tokyo (JP)

(72) Inventor: Kumi Nakata, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 308 days.

(21) Appl. No.: 17/296,022

(22) PCT Filed: Jan. 28, 2019

(86) PCT No.: PCT/JP2019/002612
§ 371 (c)(1),
(2) Date: May 21, 2021

(87) PCT Pub. No.: WO2020/157785
PCT Pub. Date: Aug. 6, 2020

(65) Prior Publication Data
US 2022/0009517 A1  Jan. 13, 2022

(51) Int. Cl.
*B60W 30/06* (2006.01)
*B60W 60/00* (2020.01)
(Continued)

(52) U.S. Cl.
CPC ........ *B60W 30/06* (2013.01); *B60W 60/0011* (2020.02); *G05D 1/0212* (2013.01);
(Continued)

(58) Field of Classification Search
CPC ............. B60W 30/06; B60W 60/0011; B60W 2555/60; G05D 1/0212; G05D 1/0276;
(Continued)

(56) References Cited

U.S. PATENT DOCUMENTS 11,255,679 B2* 2/2022 Dean ................... G01C 21/3815
2007/0244635 A1* 10/2007 Asahara ............. G01C 21/3453
701/416
(Continued)

FOREIGN PATENT DOCUMENTS

JP         7-139959 A      6/1995
JP         2011-54116 A    3/2011
JP         2015-41348 A    3/2015

OTHER PUBLICATIONS

International Search Report (PCT/ISA/210) issued in PCT/JP2019/002612, dated May 7, 2019.
(Continued)

*Primary Examiner* — Dale W Hilgendorf
(74) *Attorney, Agent, or Firm* — Birch, Stewart, Kolasch & Birch, LLP

(57) ABSTRACT

An autonomous drive instruction device shortens the time required for vehicles to arrive at a designated location from a parking location in a parking lot without a navigation map. The autonomous drive instruction device includes a travel-direction determiner and an autonomous drive instructor. The travel-direction determiner determines one path as the travel direction of the vehicle on the basis of the designated location and information on paths in a branch area. The one path corresponds to an extension direction that forms a smaller one of angles formed by extension directions of the paths from the branch area and a designated-location direction from the branch area to the designated location. The autonomous drive instructor outputs instruction information including information on the travel direction to the autonomous drive control device such that the autonomous dive control device controls the vehicle to move in the travel direction by autonomous driving.

13 Claims, 41 Drawing Sheets

(51) Int. Cl.
  *G05D 1/12*     (2006.01)
  *G08G 1/09*     (2006.01)
  *G08G 1/0968*   (2006.01)
  *G05D 1/02*     (2020.01)
(52) U.S. Cl.
  CPC ............ *G05D 1/0276* (2013.01); *G05D 1/12* (2013.01); *G08G 1/09* (2013.01); *G08G 1/096805* (2013.01); *G08G 1/096883* (2013.01); *B60W 2555/60* (2020.02)
(58) Field of Classification Search
  CPC ...... G05D 1/12; G08G 1/09; G08G 1/096805; G08G 1/096883
  See application file for complete search history.

(56) References Cited

U.S. PATENT DOCUMENTS

| | | | | |
|---|---|---|---|---|
| 2018/0299283 | A1* | 10/2018 | Wang | G08G 1/096805 |
| 2019/0382002 | A1* | 12/2019 | Yamazaki | G08G 1/09 |
| 2020/0180607 | A1* | 6/2020 | Choi | G05D 1/0214 |
| 2020/0312144 | A1* | 10/2020 | Noguchi | B60W 60/0011 |

OTHER PUBLICATIONS

Japanese Office Action dated Oct. 5, 2021 for Application No. 2020-0568678 with an English translation.

\* cited by examiner

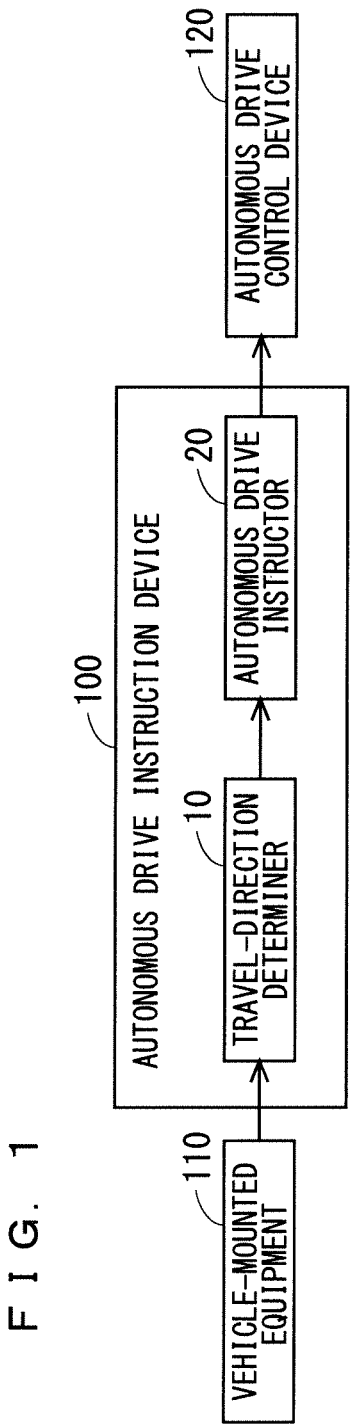
F I G. 1

F I G. 2 0
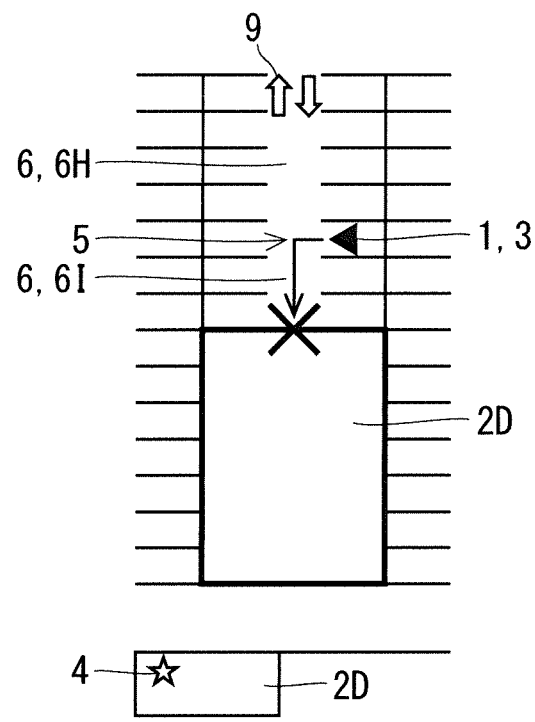

AUTONOMOUS DRIVE INSTRUCTION DEVICE AND AUTONOMOUS DRIVE INSTRUCTION METHOD

TECHNICAL FIELD

The present invention relates to an autonomous drive instruction device and an autonomous drive instruction method.

BACKGROUND ART

For users carrying heavy loads, it is a burden to move from the entrance of a facility such as a supermarket or golf links to their vehicle parked in a parking lot. Similarly, in the event of rain, it is a burden for users to move to an open-air parking lot.

In view of this, technology is known in which a vehicle is moved autonomously to a location where a user can easily get on or off the vehicle. For example, the parking guidance device disclosed in Patent Document 1 guides a vehicle from a parking location to a user's boarding location by autonomous operation. The parking guidance device uses parking marks and guide marks as criteria for guiding vehicles by autonomous operation, the parking marks and the guide marks being prescribed marks and prepared in advance on road surfaces in a parking lot.

Technology as used in the MERCEDES-BENZ MUSEUM is also known in which a plurality of sensors are installed in a parking lot and used for autonomous drive control of moving a vehicle to the entrance of a facility. Another technology is also known in which the map (i.e., sketch map) of a parking lot is distributed to a vehicle that is entering the parking lot.

In this way, a vehicle that is driven autonomously in a parking lot is controlled in accordance with information prepared in advance in the parking lot or information acquired by sensors or other equipment installed in advance in the parking lot.

PRIOR ART DOCUMENT

Patent Document

Patent Document 1: Japanese Patent Application Laid-Open No. 2015-41348

SUMMARY

Problem to be Solved by the Invention

In a parking lot for which information or the like necessary for autonomous drive is not prepared in advance, it takes long time for a vehicle to arrive at a location designated by a user because the vehicle cannot travel along an appropriate path to the designated location.

The present invention has been made in order to solve problems as described above, and it is an object of the present invention to provide an autonomous drive instruction device that can shorten the time required for an autonomously drive-controlled vehicle to move from a parking location to a designated location in a parking lot for which there is no navigation map.

Means to Solve the Problem

An autonomous drive instruction device according to the present invention outputs instruction information concerning control of autonomous driving to an autonomous drive control device that causes a vehicle to move from a parking location to a designated location in a parking lot without a map for navigation by the autonomous driving, the parking lot including a branch area that branches out and connects into a path navigable by the vehicle. The autonomous drive instruction device includes a travel-direction determiner and an autonomous drive instructor. The travel-direction determiner determines one path as a travel direction of the vehicle on the basis of the designated location and information on a plurality of paths in the branch area, the designated location being designated by a user who is outside the vehicle, the branch area being located forward of a current location of the vehicle that travels from the parking location to the designated location by an instruction of the user, the plurality of paths being recognized forward of the current location of the vehicle via vehicle-mounted equipment mounted on the vehicle, the one path corresponding to an extension direction that forms a smaller angle among a plurality of angles formed by a plurality of extension directions and a designated-location direction, the plurality of extension directions being directions of extension of the plurality of paths from the branch area, the designated-location direction being a direction in a straight line from the branch area to the designated location. The autonomous drive instructor outputs the instruction information including information on the travel direction to the autonomous drive instruction device such that the autonomous derive instruction performs the control to move the vehicle in the travel direction by the autonomous driving.

Effects of the Invention

According to the present invention, it is possible to provide an autonomous drive instruction device that can shorten the time required for an autonomously drive-controlled vehicle to arrive at a designated location from a parking location in a parking lot for which there is no navigation map.

These and other objects, features, aspects and advantages of the present invention will become more apparent from the following detailed description of the present invention when taken in conjunction with the accompanying drawings.

BRIEF DESCRIPTION OF DRAWINGS

FIG. 1 is a block diagram illustrating a configuration of an autonomous drive instruction device according to Embodiment 1.

FIG. 20 is a diagram showing another example of the processing for determining a leaving direction.

DESCRIPTION OF EMBODIMENTS

Embodiment 1

Figure 2:
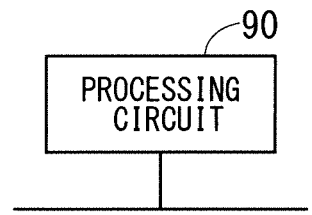
FIG. 2 is a diagram showing one example of a configuration of a processing circuit in the autonomous drive instruction device.

FIG. 1 is a block diagram illustrating a configuration of an autonomous drive instruction device 100 according to Embodiment 1. The autonomous drive instruction device 100 outputs instruction information on autonomous drive control to an autonomous drive control device 120. The autonomous drive control device 120 performs control to move a vehicle from a parking location to a designated location in a parking lot without a map for navigation, by autonomous driving and in accordance with the instruction information output from the autonomous drive instruction device 100. The parking lot includes a branch area that braches out and connects into paths navigable by vehicles.

The autonomous drive instruction device 100 includes a travel-direction determiner 10 and an autonomous drive instructor 20.

The travel-direction determiner 10 determines one path as a travel direction of a vehicle on the basis of a designated location and information on a plurality of paths in the branch area. The one path corresponds to an extension direction that forms a smaller angle with a designated-location direction from the branch area to the designated location, out of a plurality of angles formed by the designated-location direction and extension directions of the plurality of paths from the branch area. The designated location is designated by a user who is outside the vehicle. The branch area is located forward of the current location of the vehicle. The plurality of paths are located forward of the current location of the vehicle and recognized via vehicle-mounted equipment 110. Forward of the current location of the vehicle refers to a direction in which the vehicle travels. In the case where the vehicle moves backward, the aforementioned forward corresponds to backward of the vehicle. The travel-direction determiner 10 determines the travel direction of the vehicle by the above-described functions when the vehicle autonomously drive-controlled by the user instruction travels from a parking location to a designated location.

The autonomous drive instructor 20 outputs instruction information including information on the travel direction to the autonomous drive control device 120 such that the autonomous drive control device 120 performs the control to move the vehicle in the travel direction by autonomous driving.

The vehicle-mounted equipment 110 is mounted on a vehicle. For example, the vehicle-mounted equipment 110 may have the function of capturing an image of a scene forward of the vehicle. The vehicle-mounted equipment 110 may also have the function of receiving location information indicating the current location of the vehicle.

FIG. 2 is a diagram showing one example of a configuration of a processing circuit 90 of the autonomous drive instruction device 100. Each function of the travel-direction determiner 10 and the autonomous drive instructor 20 is implemented by the processing circuit 90. That is, the processing circuit 90 includes the travel-direction determiner 10 and the autonomous drive instructor 20.

In the case where the processing circuit 90 is dedicated hardware, the processing circuit 90 may, for example, be a single circuit, a composite circuit, a programmed processor, a parallel-programmed processor, an application specific integrated circuit (ASIC), a field-programmable gate array (FPGA), or a circuit configured by any combination of these circuits. Each function of the travel-direction determiner 10 and the autonomous drive instructor 20 may be implemented individually by a plurality of processing circuits, or may be implemented collectively by a single processing circuit.

Figure 3:
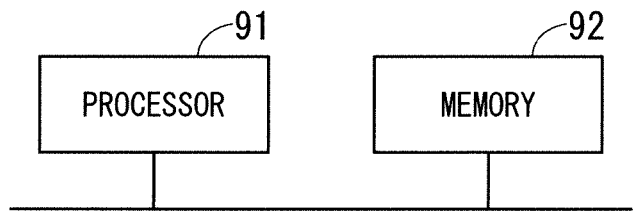
FIG. 3 is a diagram showing another example of a configuration of a processing circuit in the autonomous drive instruction device.

FIG. 3 is a diagram showing another example of a configuration of a processing circuit of the autonomous drive instruction device 100. The processing circuit includes a processor 91 and a memory 92. Each function of the travel-direction determiner 10 and the autonomous drive instructor 20 is implemented by the processor 91 executing programs stored in the memory 92. For example, each function is implemented by the processor 91 executing software or firmware described as the programs. That is, the autonomous drive instruction device 100 includes the memory 92 that stores programs and the processor 91 that executes the programs.

Described in the program is a function of the autonomous drive instruction device 100 to determine one path as the travel direction of a vehicle on the basis of a designated location and information on a plurality of paths in a branch area, and output instruction information including information on the travel direction to the autonomous drive control device 120 such that the autonomous drive control device 120 performs control to move the vehicle in the travel direction by autonomous driving. The designated location is designated by a user who is outside the vehicle. The branch area is located forward of the current location of the vehicle that moves from a parking location to the designated location by a user's instruction. The plurality of paths are recognized forward of the current location of the vehicle via the vehicle-mounted equipment 110 mounted on the vehicle. The one path corresponds to an extension direction that forms a smaller angle with a designated-location direction out of a plurality of angles formed by a plurality of extension directions and the designated-location direction that is a direction in a straight line from the branch area to the designated location. The plurality of extension directions are the directions of extension from the branch area to the plurality of paths. The programs cause a computer to execute the procedures or methods of the travel-direction determiner 10 and the autonomous drive instructor 20.

The processor 91 may, for example, be a central processing unit (CPU), an arithmetic unit, a microprocessor, a microcomputer, or a digital signal processor (DSP). The memory 92 may, for example, be a nonvolatile or volatile semiconductor memory such as a random access memory (RAM), a read only memory (ROM), a flash memory, an erasable programmable read only memory (EPROM), or an electrically erasable programmable read only memory (EEPROM). The memory 92 may be any of storage media to be used in the future, such as a magnetic disk, a flexible disk, an optical disk, a compact disk, a minidisc, or a DVD.

The above-described functions of the travel-direction determiner 10 and the autonomous drive instructor 20 may be implemented such that some of them are implemented by dedicated hardware, and the others of them are implemented by software or firmware. In this way, the processing circuit implements the aforementioned functions by using hardware, software, firmware, or any combination of them.

Figure 4:
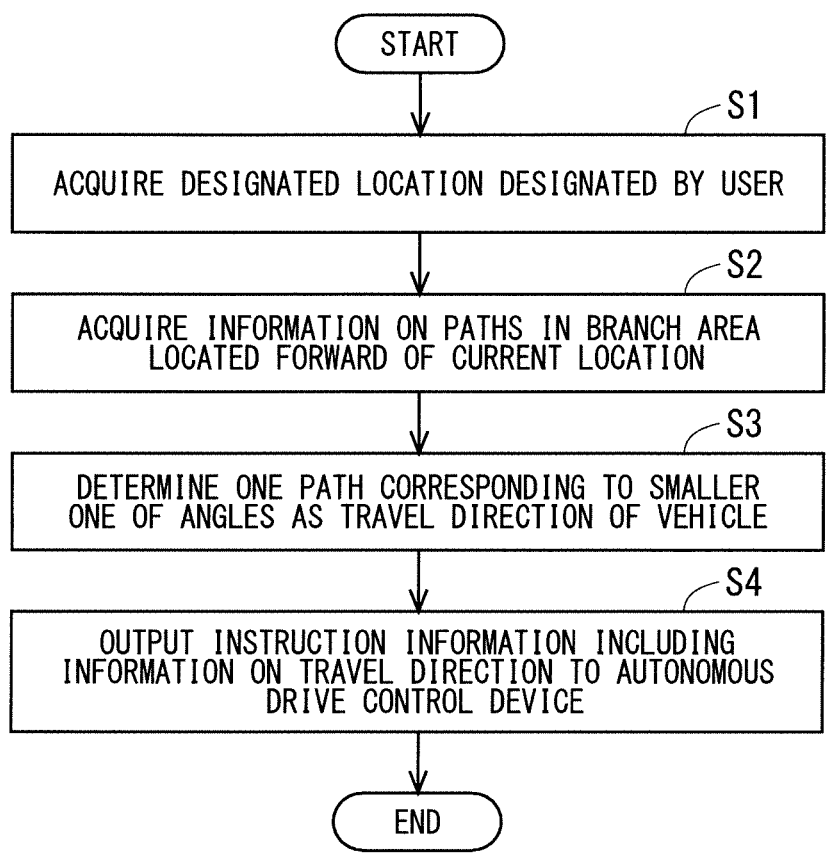
FIG. 4 is a flowchart illustrating operations of the autonomous drive instruction device and an autonomous drive instruction method according to Embodiment 1.

FIG. 4 is a flowchart illustrating operations of the autonomous drive instruction device 100 and an autonomous drive instruction method according to Embodiment 1.

In step S1, the autonomous drive instruction device 100 acquires a designated location designated by a user.

In step S2, the autonomous drive instruction device 100 acquires a current location and information on a plurality of paths in a branch area located forward of the current location. The current location and the information on the plurality of paths are acquired from the vehicle-mounted equipment 110.

In step S3, the travel-direction determiner 10 determines one path that corresponds to a smaller one of a plurality of angles as the travel direction of the vehicle. The plurality of angles refer to angles formed by a plurality of extension directions and a designated-location direction, the plurality of extension directions being the directions of extension of the plurality of paths from the branch area, and the designated-location direction being the direction in a straight line from the branch area to the designated location.

In step S4, the autonomous drive instructor 20 outputs instruction information including information on the travel direction to the autonomous drive control device 120. In this way, the autonomous drive instruction method ends.

To summarize the above description, the autonomous drive instruction device 100 according to Embodiment 1 outputs instruction information concerning the control of autonomous driving to the autonomous drive control device 120 that causes a vehicle to move from a parking location to a designated location in a parking lot without a map for navigation by the autonomous driving. The parking lot includes a branch area that branches out and connects into paths navigable by vehicles. The autonomous drive instruction device 100 includes the travel-direction determiner 10 and the autonomous drive instructor 20. The travel-direction determiner 10 determines one path as the travel direction of the vehicle on the basis of the designated location and information on a plurality of paths in the branch area. The designated location is designated by a user who is outside the vehicle. The branch area is located forward of the current location of the vehicle that moves from the parking location to the designated location by a user's instruction. The plurality of paths are recognized forward of the current location of the vehicle via the vehicle-mounted equipment 110 mounted on the vehicle. The one path corresponds to an extension direction that forms a smaller one of a plurality of angles formed by a plurality of extension directions and a designated-location direction. The plurality of extension directions are directions of extension of the plurality of paths from the branch area. The designated-location direction is a direction in a straight line from the branch area to the designated location. The autonomous drive instructor 20 outputs instruction information including information on the travel direction to the autonomous drive control device 120 such that the autonomous drive control device 120 performs the control to move the vehicle in the travel direction by autonomous driving.

The autonomous drive instruction device 100 described above shortens the time required for an autonomously drive-controlled vehicle to arrive at the designated location from the parking location in the parking lot for which there is no navigation map.

The autonomous drive instruction method according to Embodiment 1 includes outputting instruction information concerning the control of autonomous driving to the autonomous drive control device 120 that causes a vehicle to move from a parking location to a designated location driving in a parking lot without a map for navigation by the autonomous driving. The parking lot includes a branch area that branches out and connects into paths navigable by vehicles. The autonomous drive instruction method includes determining one path as the travel direction of the vehicle on the basis of the designated location and information on a plurality of paths in the branch area. The designated location is designated by a user who is outside the vehicle. The branch area is located forward of the current location of the vehicle that moves from a parking location to the designated location by a user's instruction. The plurality of paths are recognized forward of the current location of the vehicle via the vehicle-mounted equipment 110 mounted on the vehicle. The one path corresponds to an extension direction that forms a smaller one of a plurality of angles formed by a plurality of extension directions and a designated-location direction. The plurality of extension directions are the directions of extension of the plurality of paths from the branch area. The designated-location direction is a direction in a straight line from the branch area to the designated location. The autonomous drive instruction method also includes outputting instruction information including information on the travel direction to the autonomous drive control device 120 such that the autonomous drive control device 120 performs the control to move the vehicle in the travel direction by autonomous driving.

The autonomous drive instruction method described above shortens the time required for the vehicle that moves from the parking location to the designated location by autonomous drive control to arrive at the designated location in the parking lot for which there is no navigation map.

Second Embodiment

An autonomous drive instruction device and an autonomous drive instruction method according to Embodiment 2 will be described. Embodiment 2 is a subordinate concept of Embodiment 1, and the autonomous drive instruction device according to Embodiment 2 includes each constituent element of the autonomous drive instruction device 100 according to Embodiment 1. Note that descriptions of constituent elements and operations that are similar to those of Embodiment 1 shall be omitted.

Figure 5:
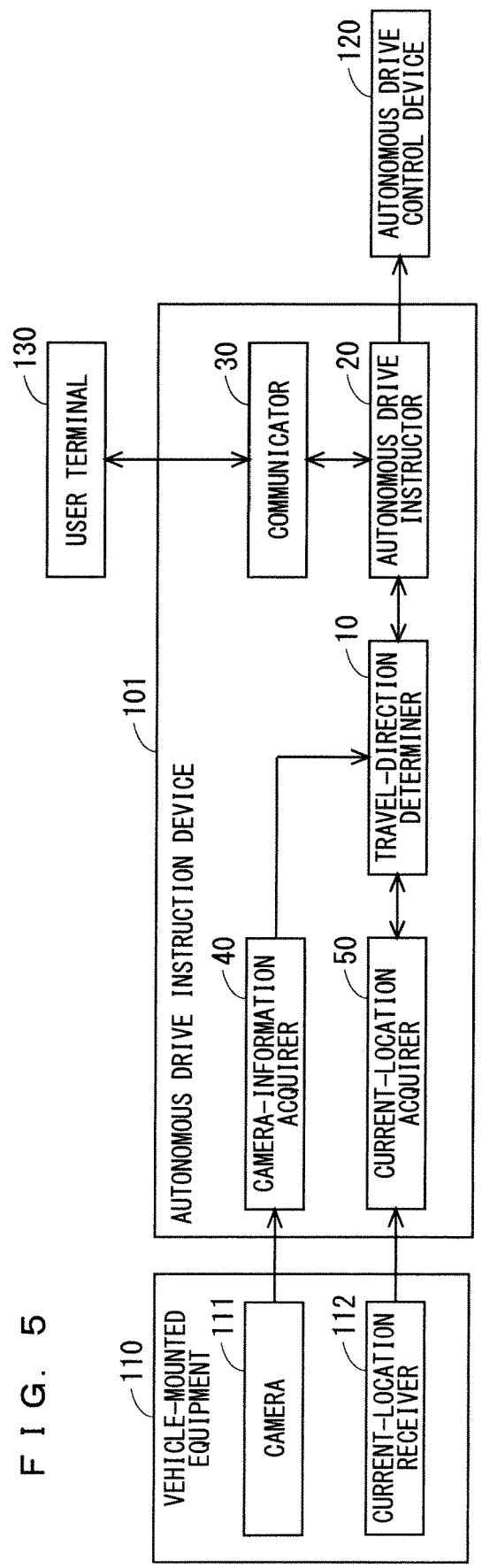
FIG. 5 is a block diagram illustrating a configuration of an autonomous drive instruction device according to Embodiment 2.

FIG. 5 is a block diagram illustrating a configuration of an autonomous drive instruction device 101 according to Embodiment 2.

The autonomous drive instruction device 101 includes, in addition to the travel-direction determiner 10 and the autonomous drive instructor 20, a communicator 30, a camera-information acquirer 40, and a current-location acquirer 50. In FIG. 5, a user terminal 130, vehicle-mounted equipment 110, and an autonomous drive control device 120 are also illustrated as devices that operate in relation to the autonomous drive instruction device 101.

The user terminal 130 is a terminal carried by a user and communicates with the communicator 30 of the autonomous drive instruction device 101. The user terminal 130 transmits a user instruction to the communicator 30 by a user operation. For example, the user instruction includes information on a designated location designated by the user, and instruction information that triggers autonomous drive from a parking location to the designated location. The designated location may, for example, be coordinates based on a global navigation satellite system (GNSS).

The vehicle-mounted equipment 110 includes a current-location receiver 112 and a camera 111. The current-location receiver 112 receives location information indicating the current location of the vehicle. The current-location receiver 112 receives, for example, signals from a GNSS such as a global positioning system (GPS). The camera 111 captures an image of the periphery of the vehicle such as an image of a scene forward of the current location of the vehicle. Forward of the vehicle refers to the travel direction of the vehicle. For example, when the vehicle travels forward, forward of the vehicle corresponds to the direction in which the vehicle travels forward, and when the vehicle travels backward, forward of the vehicle corresponds to the direction in which the vehicle travels backward.

The communicator 30 communicates with the user terminal 130 operated by a user who is outside the vehicle. The communicator 30 receives a user instruction transmitted from the user terminal 130 and outputs the user instruction to the autonomous drive instructor 20. The communicator 30 also transmits information on the vehicle to the user terminal 130.

The current-location acquirer 50 acquires the current location of the vehicle from the current-location receiver 112. For example, the vehicle acquires the current location on a travel path along which the vehicle travels from the parking location to the designated location in accordance with the user's instruction.

The camera-information acquirer 40 acquires the image of the scene forward of the vehicle, captured by the camera 111. The camera-information acquirer 40 also extracts information necessary to operate the travel-direction determiner 10 on the basis of the acquired image. That is, the camera-information acquirer 40 extracts, as information on the periphery of the vehicle, information on a plurality of paths in a branch area located forward of the vehicle.

The travel-direction determiner 10 acquires information on the designated location notified via the autonomous drive instructor 20, the information being included in the user instruction received by the communicator 30. The travel-direction determiner 10 acquires the current location of the vehicle from the current-location acquirer 50. The travel-direction determiner 10 acquires the information on the plurality of paths located forward of the vehicle from the camera-information acquirer 40. The travel-direction determiner 10 obtains the location of the branch area and extension directions the plurality of paths from the branch area on the basis of the current location and the information on the plurality of paths. The travel-direction determiner 10 also obtains a designated-location direction that is the direction from the branch area to the designated location, on the basis of the location of the branch area and the designated location. To be more specific, the designated-location direction may, for example, be a direction from a branch point of the plurality of paths in the branch area to the designated location, or may be a direction from the current location of the vehicle entering the branch area to the designated location. The branch point of the plurality of paths refers to the point of intersection of the extension directions of the plurality of paths. The travel-direction determiner 10 obtains a plurality of angles formed by the extension directions of the plurality of paths and the designated-location direction. For example, the travel-direction determiner 10 obtains a plurality of angles formed by vectors that correspond to the extension directions of the plurality of paths and a vector that corresponds to the designated-location direction.

The travel-direction determiner 10 determines one path corresponding to an extension direction that forms a smaller one of the plurality of angles, as the travel direction of the vehicle. For example, when the angle formed by the extension direction of one path and the designated-location direction is smaller than the angle formed by the extension direction of the other path and the designated-location direction, the travel-direction determiner 10 determines the one path as the travel direction of the vehicle. Alternatively, for example, the travel-direction determiner 10 determines one path corresponding to an extension direction that forms a smallest angle among the plurality of angles, as the travel direction of the vehicle.

The autonomous drive instructor 20 outputs instruction information including information on the travel direction determined by the travel-direction determiner 10 to the autonomous drive control device 120.

The autonomous drive control device 120 moves the vehicle in the travel direction by autonomous drive control on the basis of the instruction information.

Figure 6:
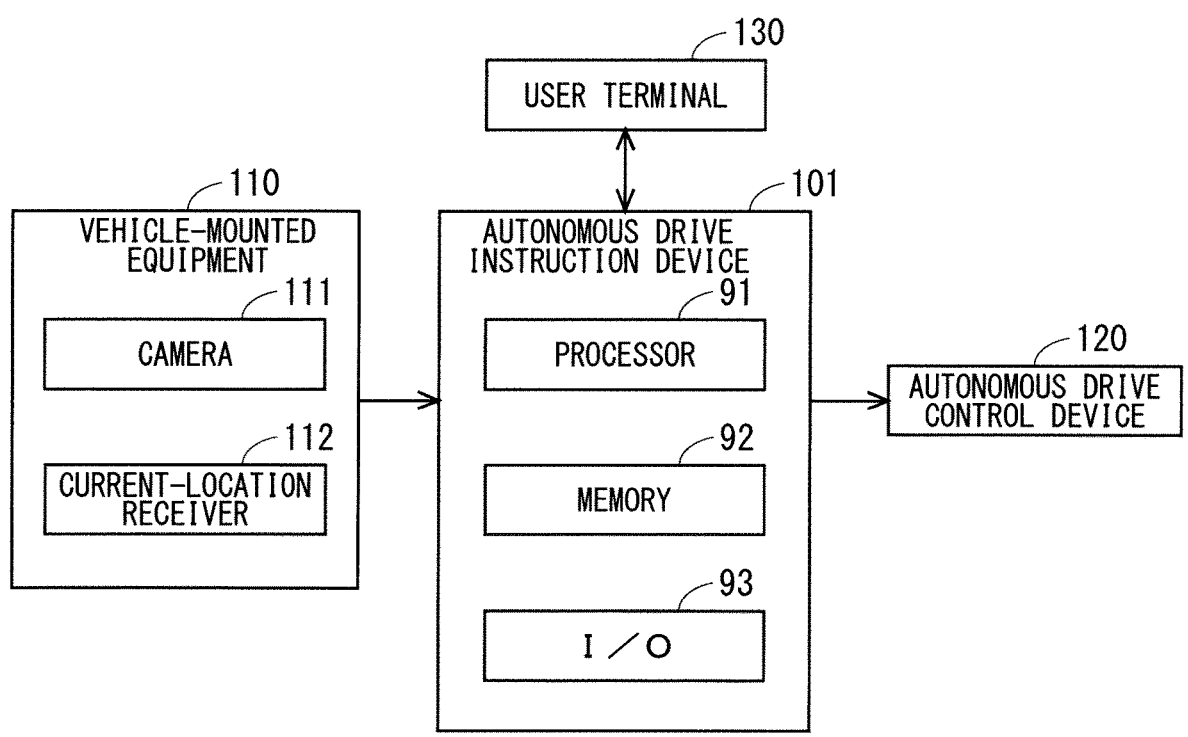
FIG. 6 is a diagram illustrating a hardware configuration of the autonomous drive instruction device according to Embodiment 2.

FIG. 6 is a diagram illustrating a hardware configuration of the autonomous drive instruction device 101 according to Embodiment 2.

The autonomous drive instruction device 101 includes a processor 91, a memory 92, and an I/O port 93. Each function of the communicator 30, the current-location acquirer 50, the camera-information acquirer 40, the travel-direction determiner 10, and the autonomous drive instructor 20 is implemented by the processor 91 executing programs stored in the memory 92. The communicator 30 has the I/O port 93.

Figure 7:
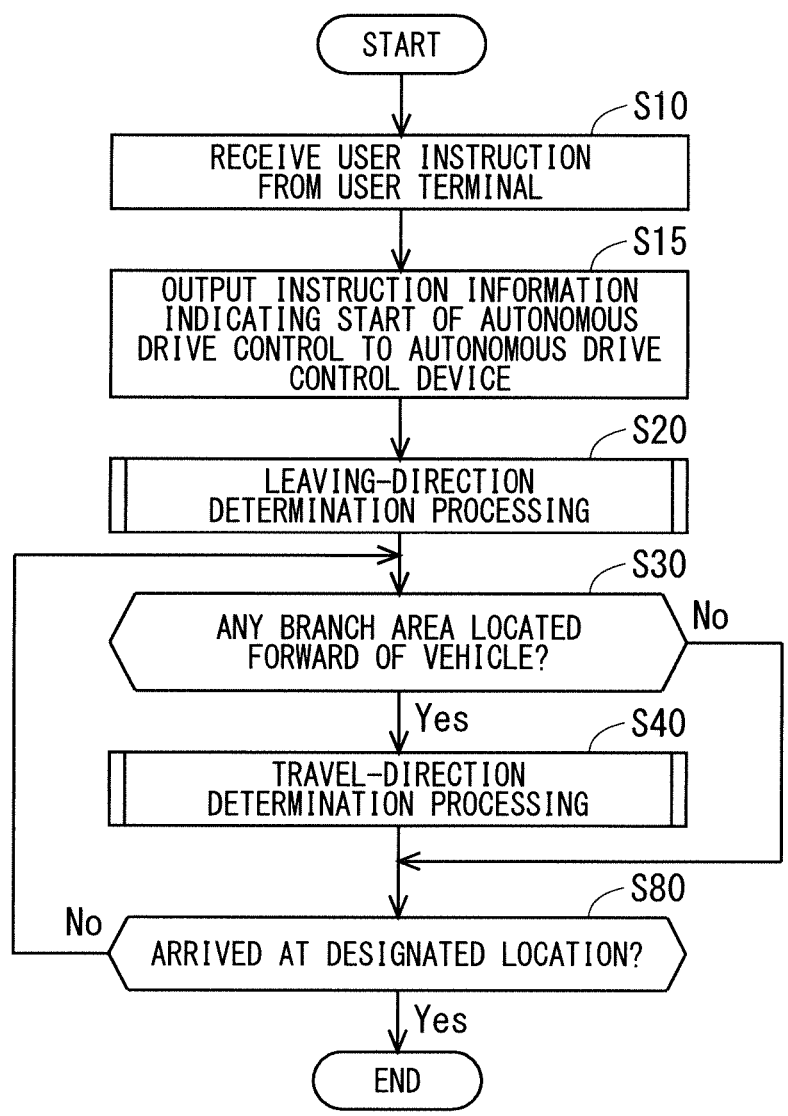
FIG. 7 is a flowchart illustrating operations of the autonomous drive instruction device and an autonomous drive instruction method according to Embodiment 2.
Figure 8:
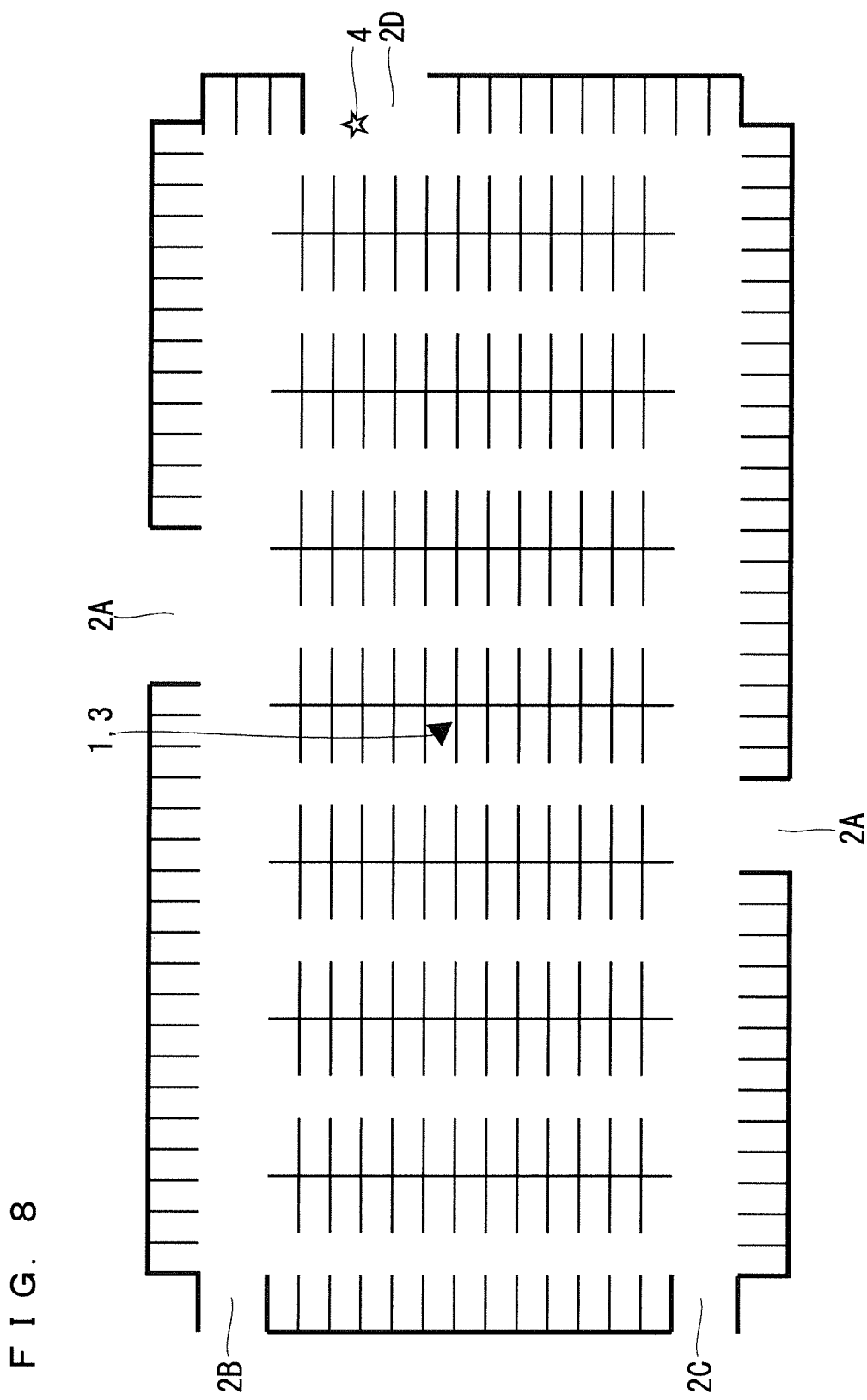
FIG. 8 is a diagram showing one example of a parking location of a vehicle and a designated location in a parking lot.

FIG. 7 is a flowchart illustrating operations of the autonomous drive instruction device 101 and the autonomous drive instruction method according to Embodiment 2. FIG. 8 is a diagram showing one example of a parking location 3 of a vehicle 1 and a designated location 4 in a parking lot. The parking lot has parking entrances 2A for vehicles, a parking exit 2B for vehicles, an approach entrance 2C to the second-story parking lot, and a facility entrance 2D that is the entrance into a facility or the like for users. The vehicle 1 is parked or stops at the parking location 3. As one example, the designated location 4 is set in front of the facility entrance 2D. Devices relating to autonomous drive of the vehicle 1, such as the autonomous drive instruction device 101 and the autonomous drive control device 120, have neither the map of the parking lot nor information on traffic regulations.

In step S10, the communicator 30 receives a user instruction from the user terminal 130. For example, the user instruction includes an instruction indicating that the user wants to send the vehicle to the designated location 4.

In step S15, the autonomous drive instructor 20 outputs instruction information instructing to start autonomous drive control of the vehicle 1 to the autonomous drive control device 120. The autonomous drive instructor 20 notifies the travel-direction determiner 10 of the designated location 4 received by the communicator 30. The designated location 4 is included in the aforementioned user instruction.

In step S20, processing for determining a leaving direction is executed. Details thereof will be described later.

In step S30, the travel-direction determiner 10 determines whether or not there is a branch area located forward of the vehicle 1. If there is a branch area located forward of the vehicle 1, step S40 is executed. If there is no branch area located forward of the vehicle 1, step S80 is executed.

In step S40, processing for determining a travel direction is executed. Details thereof will be described later.

In step S80, the travel-direction determiner 10 determines whether or not the vehicle 1 has arrived at the designated location 4. If the vehicle 1 has arrived at the designated location 4, the autonomous drive instruction method ends. If the vehicle 1 has not arrived at the designated location 4, step S30 is executed again.

Figure 9:
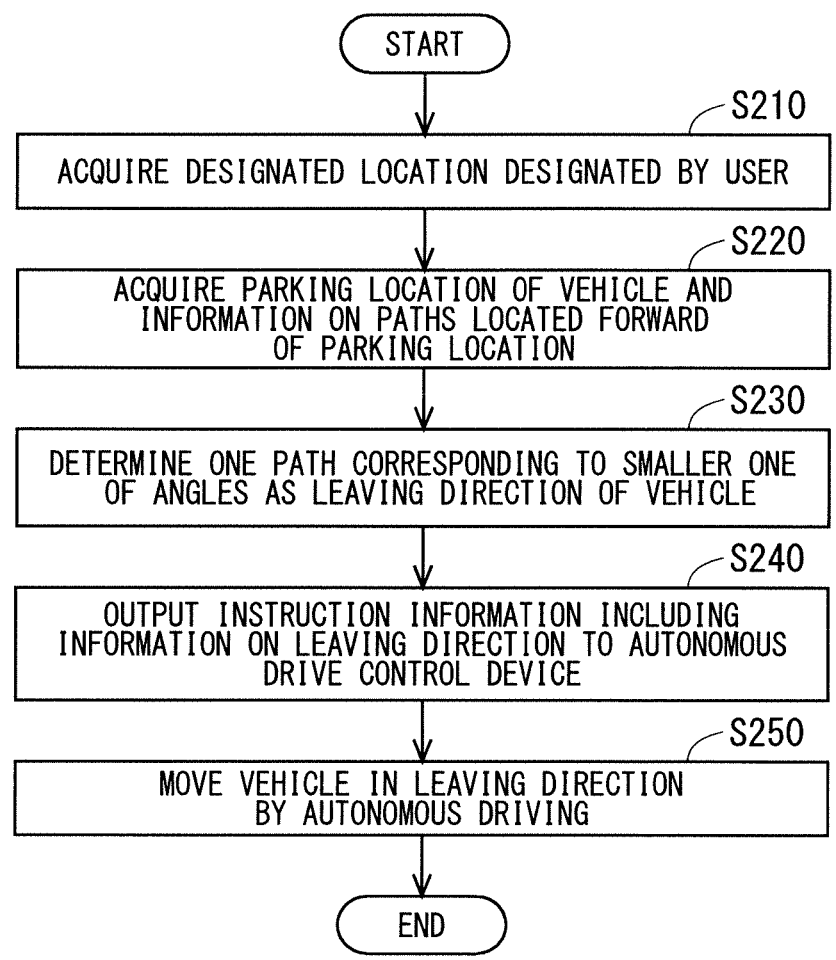
FIG. 9 is a flowchart illustrating details of processing for determining a leaving direction according to Embodiment 2.
Figure 10:
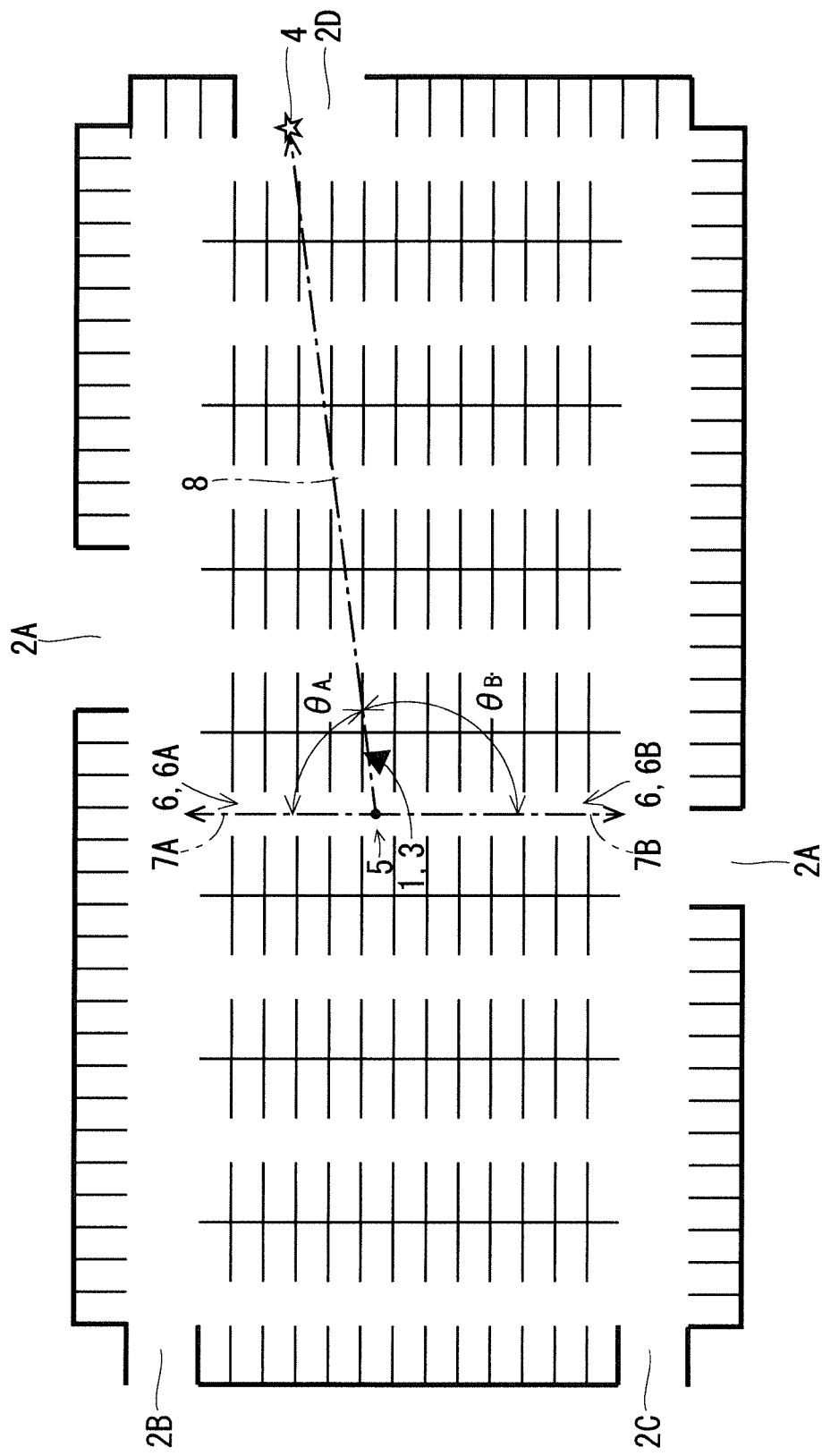
FIG. 10 is a diagram showing one example of the processing for determining a leaving direction.

FIG. 9 is a flowchart illustrating the details of the processing for determining a leaving direction according to Embodiment 2. FIG. 10 is a diagram showing one example of the processing for determining a leaving direction.

In step S210, the travel-direction determiner 10 acquires the designated location 4 designated by the user. The designated location 4 is notified from the autonomous drive instructor 20. Here, the designated location 4 corresponds to the location of the user carrying the user terminal 130 at the facility entrance 2D.

In step S220, the travel-direction determiner 10 acquires information on the parking location 3 of the vehicle 1 and a plurality of paths 6 in the branch area 5 located forward of the parking location 3. Details of this step will be described hereinafter. As illustrated in FIG. 10, the vehicle 1 is parked at the parking location 3. The travel-direction determiner 10 acquires the parking location 3 by acquiring the current location of the vehicle 1 from the current-location acquirer 50. The travel-direction determiner 10 also acquires information on the plurality of paths 6 in the branch area 5 located forward of the vehicle 1, from the camera-information acquirer 40. In FIG. 10, the branch area 5 located forward of the vehicle 1 branches out into two paths 6A and 6B. Thus, the travel-direction determiner 10 recognizes the presence of the two paths 6A and 6B as the information on the plurality of paths 6. The travel-direction determiner 10 obtains extension directions 7A and 7B of the two paths 6A and 6B from the branch area 5, on the basis of the location of the branch area 5 and the information on the two paths 6A and 6B. The travel-direction determiner 10 also obtains a designated-location direction 8 from the branch area 5 to the designated location 4, on the basis of the location of the branch area 5 and the designated location 4. Note that the location of the branch area 5 forward of the vehicle 1 is obtained based on, for example, the current location of the vehicle 1 and the image acquired by the camera-information acquirer 40.

In step S230, the travel-direction determiner 10 determines one path corresponding to a smaller angle among the plurality of angles as a leaving direction of the vehicle 1. For example, in FIG. 10, the travel-direction determiner 10 obtains an angle $\theta_A$ formed by the extension direction 7A of one path 6A and the designated-location direction 8. The travel-direction determiner 10 further obtains an angle $\theta_B$ formed by the extension direction 7B of the other path 6B and the designated-location direction 8. The angle $\theta_A$ is smaller than the angle $\theta_B$. Thus, the travel-direction determiner 10 determines the one path 6A corresponding to the angle $\theta_A$ as the leaving direction of the vehicle 1.

In step S240, the autonomous drive instructor 20 outputs instruction information including information on the leaving direction to the autonomous drive control device 120.

In step S250, the autonomous drive control device 120 causes the vehicle 1 to move in the leaving direction by autonomous driving. In this way, the processing for determining a leaving direction ends.

Figure 11:
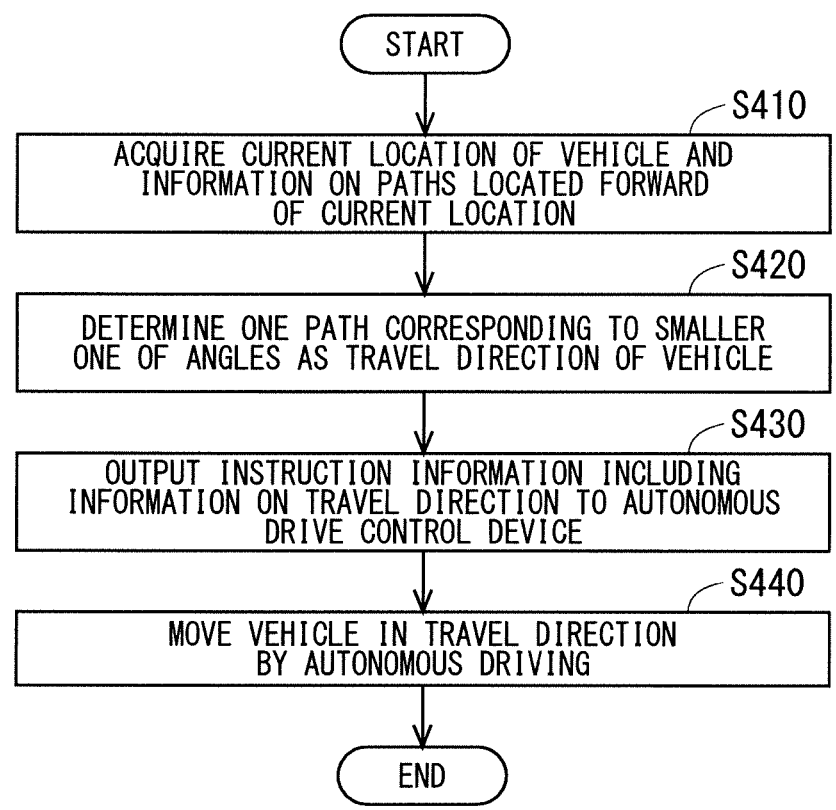
FIG. 11 is a flowchart illustrating details of processing for determining a travel direction according to Embodiment 2.
Figure 12:
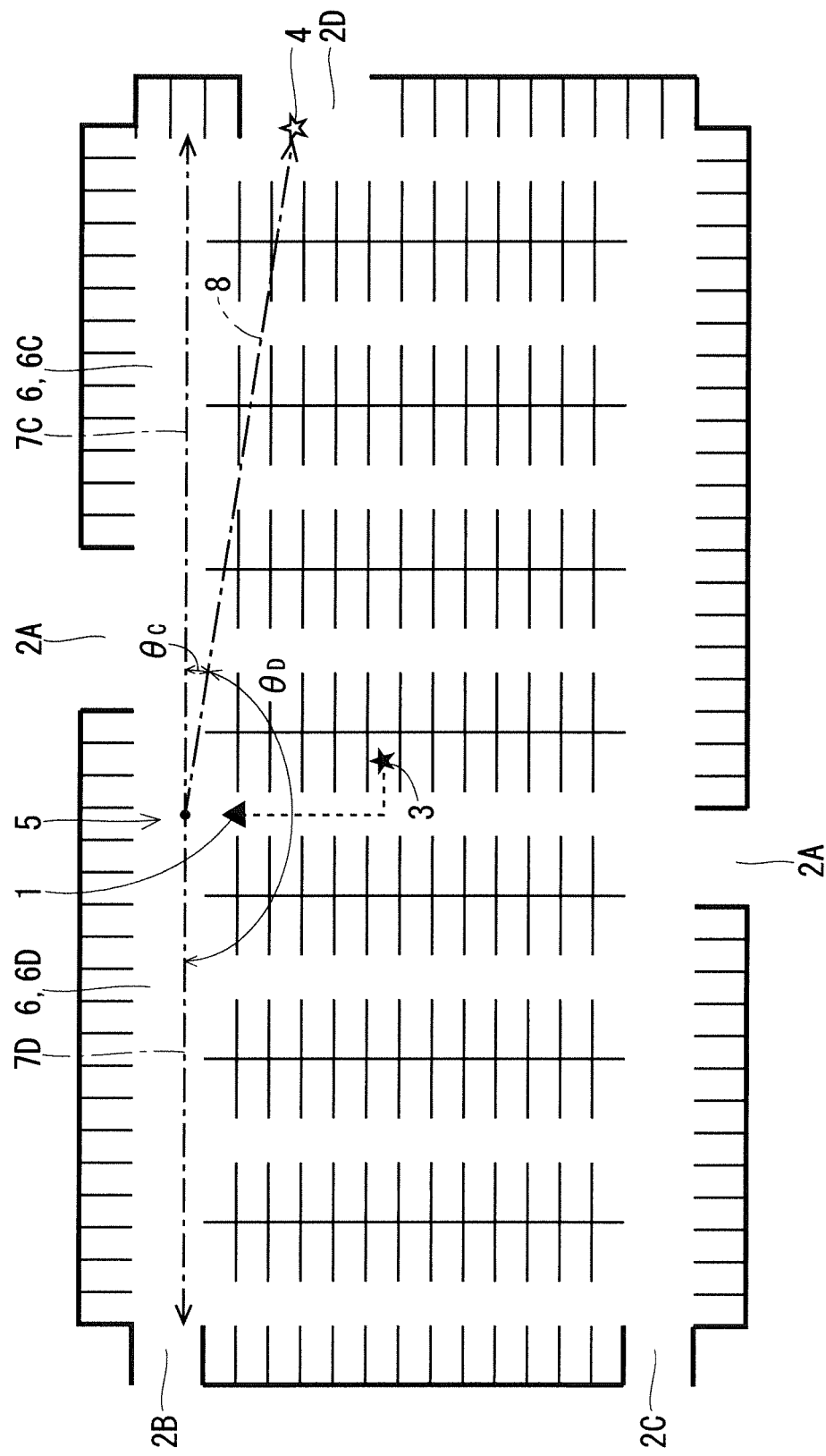
FIG. 12 is a diagram showing one example of the processing for determining a travel direction.

FIG. 11 is a flowchart illustrating the details of processing for determining a travel direction according to Embodiment 2. FIG. 12 is a diagram showing one example of the processing for determining a travel direction.

In step S410, the travel-direction determiner 10 acquires the current location of the vehicle 1 and the information on the plurality of paths 6 in the branch area 5 located forward of the current location. Details of this step will be described hereinafter. The travel-direction determiner 10 acquires the current location of the vehicle 1 from the current-location acquirer 50. The travel-direction determiner 10 also acquires the information on the plurality of paths 6 in the branch area 5 located forward of the vehicle 1 from the camera-information acquirer 40. In FIG. 12, the branch area 5 located forward of the vehicle 1 branches out into two paths 6C and 6D. Thus, the travel-direction determiner 10 recognizes the presence of the two paths 6C and 6D as the information on the plurality of paths 6. The travel-direction determiner 10 obtains extension directions 7C and 7D of the two paths 6C and 6D on the basis of the location of the branch area 5 and the information on the two paths 6C and 6D. The travel-direction determiner 10 also obtains the designated-location direction 8 on the basis of the location of the branch area 5 and the designated location 4.

In step S420, the travel-direction determiner 10 determines one path corresponding to a smaller one of the plurality of angles as the travel direction of the vehicle 1. For example, in FIG. 12, the travel-direction determiner 10 obtains an angle $\theta_C$ formed by the extension direction 7C of one path 6C and the designated-location direction 8. The travel-direction determiner 10 further obtains an angle $\theta_D$ formed by the extension direction 7D of the other path 6D and the designated-location direction 8. The angle $\theta_C$ is smaller than the angle $\theta_D$. Thus, the travel-direction determiner 10 determines the one path 6C corresponding to the angle $\theta_C$ as the travel direction of the vehicle 1.

In step S430, the autonomous drive instructor 20 outputs instruction information including information on the travel direction to the autonomous drive control device 120.

In step S440, the autonomous drive control device 120 moves the vehicle 1 in the travel direction by autonomous driving. In this way, the processing for determining a travel direction ends.

As described above, even if the autonomous drive control device 120 or the like does not have map information on the parking lot, the autonomous drive instruction device 101 according to Embodiment 2 determines the paths 6C and 6D (or paths 6A and 6B) navigable by the vehicle 1 on the basis of the information on the periphery of the vehicle 1 acquired by the vehicle-mounted equipment 110. The autonomous drive instruction device 101 determines the travel direction of the vehicle 1 on the basis of the angles $\theta_C$ and $\theta_D$ (or the angles $\theta_A$ and $\theta_B$) formed by the extension directions 7C and 7D (or the extension directions 7A and 7B) of the paths 6C and 6D (or the paths 6A and 6B) and the designated-location direction 8. Accordingly, the autonomous drive instruction device 101 shortens the time required for the vehicle 1 to arrive at the designated location 4. The autonomous drive instruction device 101 according to Embodiment 2 also allows the vehicle 1 to move in a direction of the shortest direct distance between the two points, i.e., the current location of the vehicle 1 and the designated location 4. As described above, the autonomous drive instruction device 101 achieves the function of supporting the sending of vehicles by autonomous operation in parking lots.

Third Embodiment

An autonomous drive instruction device and an autonomous drive instruction method according to Embodiment 3 will be described. Embodiment 3 is a subordinate concept of Embodiment 1, and the autonomous drive instruction device according to Embodiment 3 includes each constituent element of the autonomous drive instruction device 100 according to Embodiment 1. Note that descriptions of constituent elements and operations that are similar to those of Embodiment 1 or 2 shall be omitted.

The travel-direction determiner 10 acquires information on traffic regulations on the plurality of paths 6, in addition to the designated location 4, the current location of the vehicle 1, and the information on the plurality of paths 6 in the branch area 5 located forward of the vehicle 1. The traffic regulations are prepared in advance for the parking lot. For example, the traffic regulations include no entry, one way, momentary stop, open to traffic, suspension of traffic, or destinations. The traffic regulations are indicated by markings or signs provided in the parking lot. The Markings are directly drawn on the roads. The markings include, for example, arrows indicating directions in which vehicles can travel or momentary stop lines. The signs include, for example, signboards indicating destinations to the other floors in a multistory parking lot, the names of neighboring facilities around the parking lot, and the names of places outside the parking lot. The signboards display, for example, "To 2nd Floor," "Roof Floor," "Exit," "In Direction of AA" (AA refers to, for example, the name of a place or building). The traffic regulations are recognized via the vehicle-mounted equipment 110. Here, the camera 111 captures an image of markings or signs located forward of the vehicle 1. The camera-information acquirer 40 extracts information on traffic regulations on each path on the basis of the captured image. The travel-direction determiner 10 acquires the information on the traffic regulations from the camera-information acquirer 40.

The travel-direction determiner 10 selects at least one of the plurality of paths 6 that is navigable by the vehicle 1 in accordance with the traffic regulations, on the basis of the information on the plurality of paths 6 and the information on the traffic regulations. When there are two or more paths navigable by the vehicle 1 in accordance with the traffic regulations, the travel-direction determiner 10 obtains two or more angles formed by the extension directions of the two or more paths and the designated-location direction 8. The travel-direction determiner 10 determines one path corresponding to an extension direction that forms a smaller one of the two or more angles as the travel direction of the vehicle 1. In the case where there is only one path navigable by the vehicle 1 in accordance with the traffic regulations, the travel-direction determiner 10 determines this one path as the travel direction of the vehicle 1.

The function of the travel-direction determiner 10 according to Embodiment 3 is implemented by the processor 91 illustrated in FIG. 3 or 6 executing programs stored in the memory 92.

Operations of the autonomous drive instruction device and the autonomous drive instruction method according to Embodiment 3 differ from those of Embodiment 2 in details of the processing for determining a travel direction in step S40 illustrated in FIG. 7.

Figure 13:
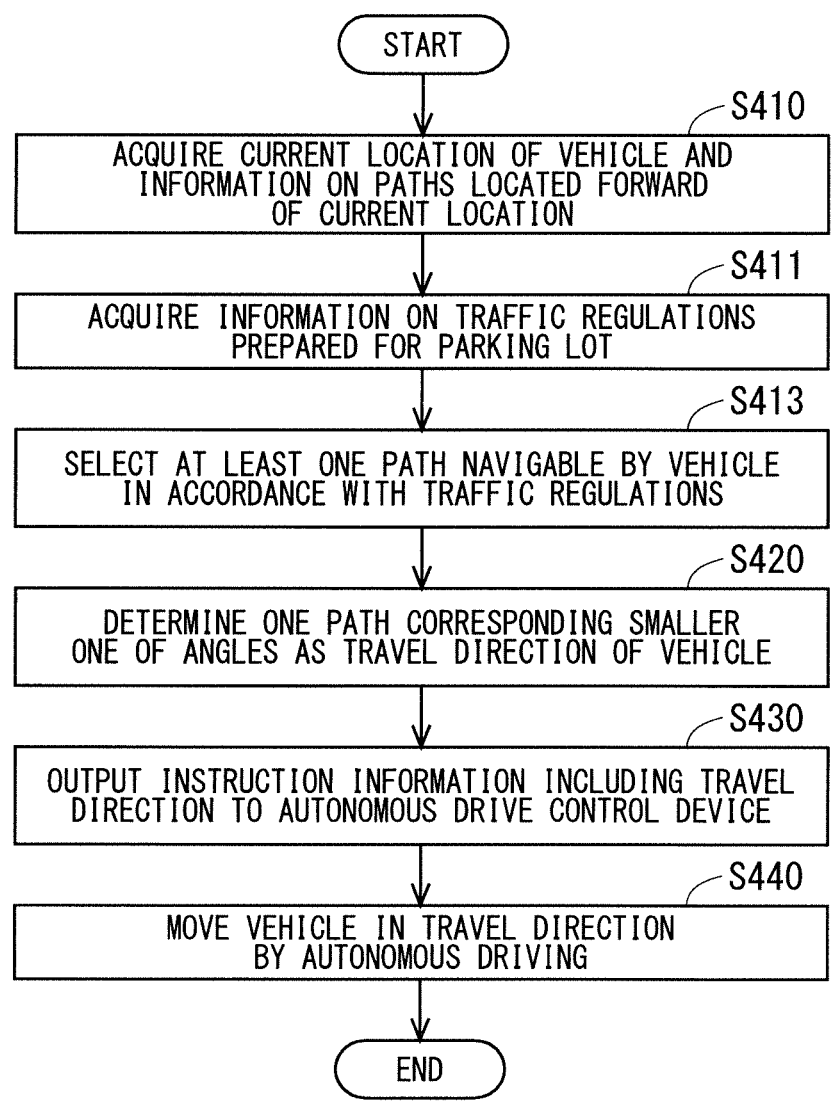
FIG. 13 is a flowchart illustrating details of processing for determining a travel direction according to Embodiment 3.
Figure 14:
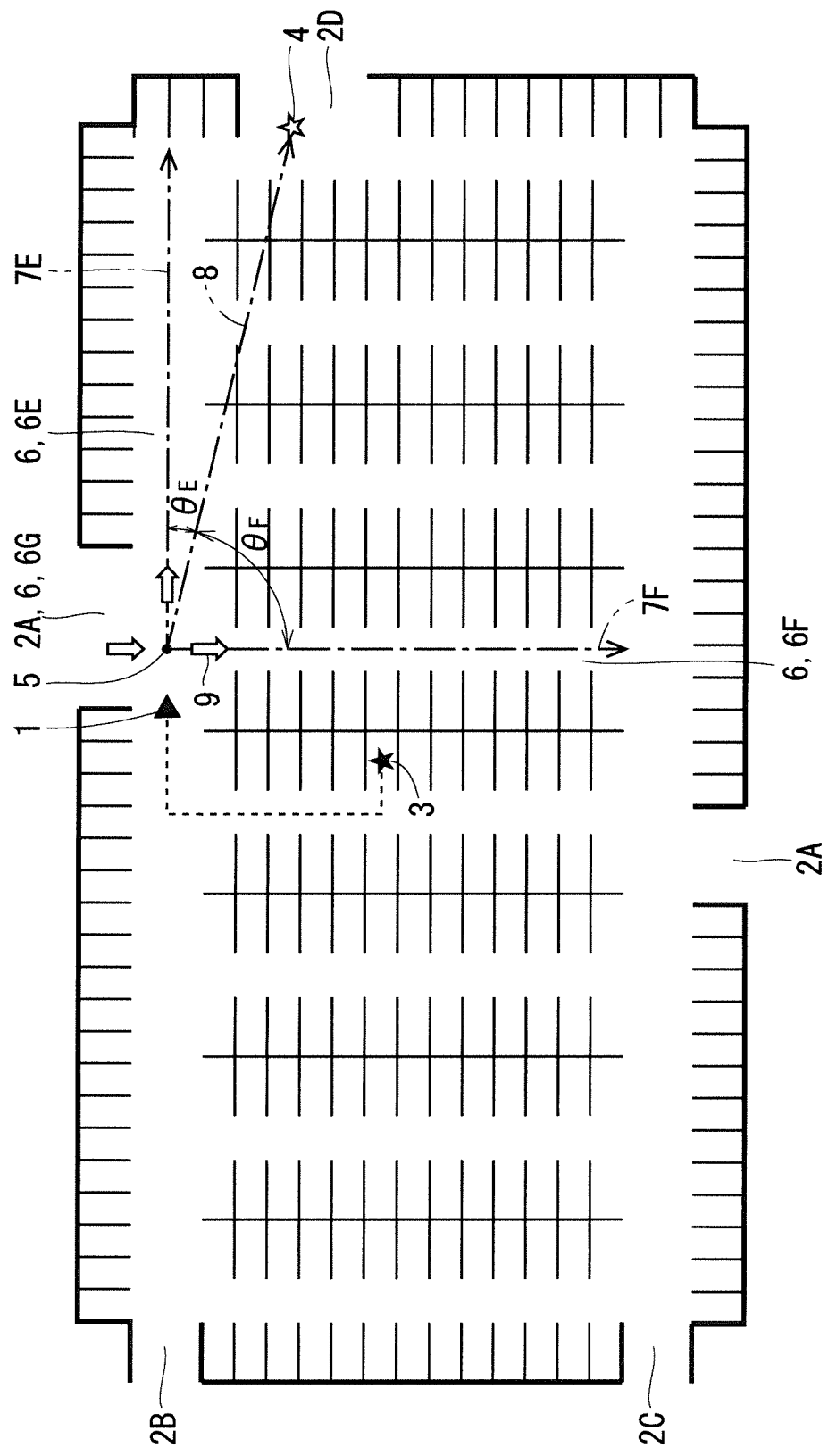
FIG. 14 is a diagram showing one example of the processing for determining a travel direction.

FIG. 13 is a flowchart illustrating the details of the processing for determining a travel direction according to Embodiment 3. FIG. 14 is a diagram showing one example of the processing for determining a travel direction.

In step S410, the travel-direction determiner 10 acquires the current location of the vehicle 1 and the information on the plurality of paths 6 in the branch area 5 located forward of the current location. At this time, the travel-direction determiner 10 acquires the information on the plurality of paths 6 on the basis of the image of a scene forward of the vehicle 1, captured by the camera 111. In FIG. 14, the branch area 5 located forward of the current location of the vehicle 1 branches out into three paths 6E, 6F, and 6G.

In step S411, the travel-direction determiner 10 acquires the information on the traffic regulations prepared for the parking lot including the plurality of paths 6. For example, the camera 111 captures an image of a scene forward of the vehicle 1. The camera-information acquirer 40 extracts information on traffic regulations 9 prepared for the plurality of paths 6 on the basis of markings or signs included in the captured image. The travel-direction determiner 10 acquires the information on the traffic regulations 9 from the camera-information acquirer 40. Here, the traffic regulations on the three paths 6E, 6F, and 6G are all one-way.

In step S413, the travel-direction determiner 10 selects at least one path navigable by the vehicle 1 in accordance with the traffic regulations 9. Here, the vehicle 1 cannot turn to the left to the path 6G, but can go straight to the path 6E or turn to the right to the path 6F. Thus, the travel-direction determiner 10 selects the paths 6E and 6F. The travel-direction determiner 10 obtains extension directions 7E and 7F of the two paths 6E and 6F on the basis of the location of the branch area 5 and the information on the two paths 6E and 6F. The travel-direction determiner 10 also obtains the designated-location direction 8 on the basis of the location of the branch area 5 and the designated location 4.

In step S420, one path corresponding to a smaller one of a plurality of angles is determined as the travel direction of the vehicle 1. For example, in FIG. 14, the travel-direction determiner 10 obtains an angle $\theta_E$ formed by the extension direction 7E of one path 6E and the designated-location direction 8. The travel-direction determiner 10 further obtains an angle $\theta_F$ formed by the extension direction 7F of the other path 6F and the designated-location direction 8. The angle $\theta_E$ is smaller than the angle $\theta_F$. Thus, the travel-direction determiner 10 determines the one path 6E corresponding to the angle $\theta_E$ as the travel direction of the vehicle 1.

In step S430, instruction information including information on the travel direction is output to the autonomous drive control device 120.

In step S440, the vehicle 1 is moved in the travel direction by autonomous driving. In this way, the processing for determining a travel direction ends. Next, step S80 illustrated in FIG. 7 is executed.

To summarize the above description, the travel-direction determiner 10 of the autonomous drive instruction device according to Embodiment 3 selects at least one path 6E, 6F navigable by the vehicle 1 in accordance with the traffic regulations 9 from among the plurality of paths 6, on the basis of the information on the plurality of paths 6 and the information on the traffic regulations 9 prepared for the parking lot including the plurality of paths 6 and recognized via the vehicle-mounted equipment 110. One path 6E is included in at least one path 6E, 6F navigable by the vehicle 1.

This autonomous drive instruction device moves the vehicle 1 to the designated location 4 in accordance with not only the information prepared for autonomous drive but also markings or signs provided in the parking lot so as to be recognizable by users. Accordingly, the autonomous drive instruction device can move the vehicle 1 to the designated location 4 without inhibiting the passage of neighboring vehicles or pedestrians.

Fourth Embodiment

An autonomous drive instruction device and an autonomous drive instruction method according to Embodiment 4 will be described. Embodiment 4 is a subordinate concept of Embodiment 1, and the autonomous drive instruction device according to Embodiment 4 includes each constituent element of the autonomous drive instruction device 100 according to Embodiment 1. Note that descriptions of constituent elements and operations that are similar to those of any of Embodiments 1 to 3 shall be omitted.

Figure 15:
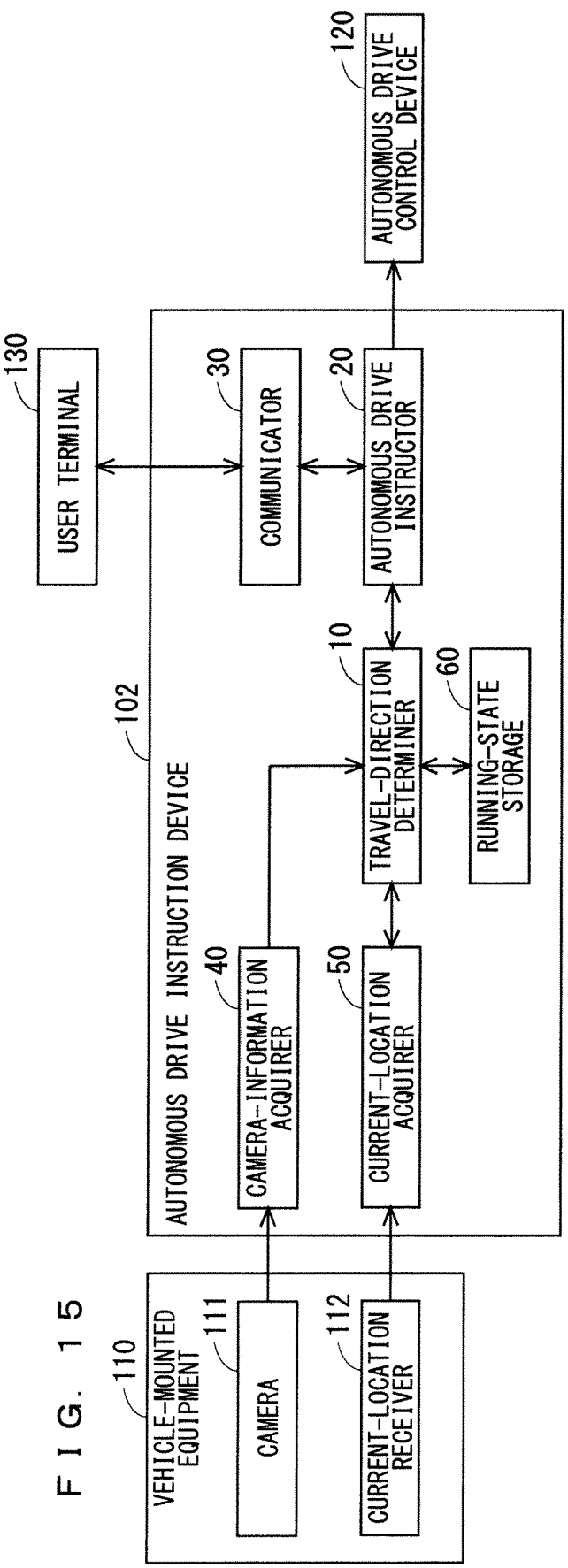
FIG. 15 is a block diagram illustrating a configuration of an autonomous drive instruction device according to Embodiment 4.

FIG. 15 is a block diagram illustrating a configuration of an autonomous drive instruction device 102 according to Embodiment 4. The autonomous drive instruction device 102 further includes a running-state storage 60.

The running-state storage 60 stores the approach path to the parking location 3 and information on the traffic regulations 9 on the approach path. In Embodiment 4, the approach path to the parking location 3 refers to a path on which the vehicle 1 is travelling when entering the parking location 3, the path being in front of the parking location 3. The traffic regulations 9 on the approach path refers to the traffic regulations 9 prepared in advance for the parking lot. Here, the camera-information acquirer 40 extracts the information on the traffic regulations 9 on the approach path on the basis of the image of the scene forward of the vehicle 1, captured by the camera 111. The running-state storage 60 stores the information on the traffic regulations 9, extracted by the camera-information acquirer 40.

When the vehicle 1 leaves the parking location 3, the travel-direction determiner 10 determines the leaving direction of the vehicle 1 on the basis of the approach path and the information on the traffic regulations 9 on the approach path, both stored in the running-state storage 60. Here, when the vehicle 1 is determined to be capable of leaving for the same path as the approach path in accordance with the traffic regulations 9, the travel-direction determiner 10 determines the approach path as the travel direction of the vehicle 1.

The functions of the running-state storage 60 and the travel-direction determiner 10 according to Embodiment 4 are implemented by the processor 91 illustrated in FIG. 3 or 6 executing programs stored in the memory 92. The storage function of the running-state storage 60 is implemented by, for example, the memory 92.

In the autonomous drive instruction method according to Embodiment 4, the following processing for storing an approach path is executed before step S10 illustrated in FIG. 7.

Figure 16:
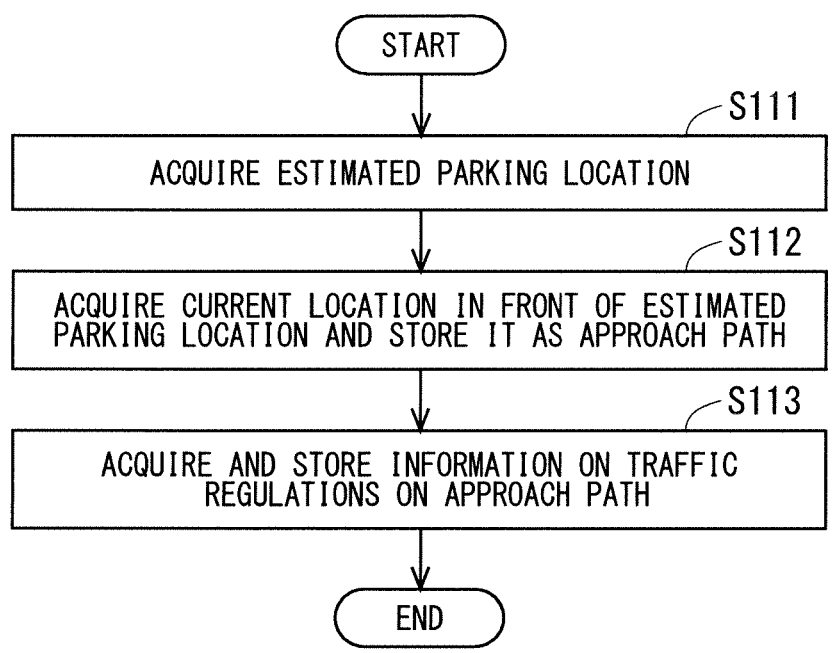
FIG. 16 is a flowchart illustrating processing for storing an approach path according to Embodiment 4.
Figure 17:
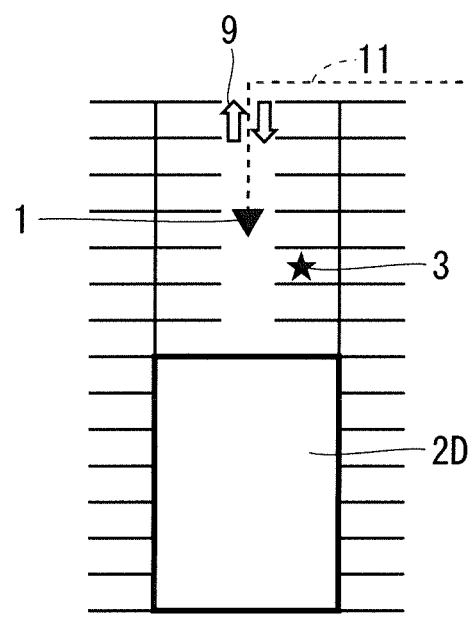
FIG. 17 is a diagram illustrating an approach path of a vehicle just before reaching a parking location.

FIG. 16 is a flowchart illustrating processing for storing an approach path according to Embodiment 4. FIG. 17 is a diagram illustrating the approach path 11 of the vehicle 1 in front of the parking location 3. FIG. 17 shows a different type of facility entrance 2D than the previous figures, i.e., one located at the end of an approach path, not to the side the approach path (as shown in FIGS. 8, 10, 12, and 14).

In step S111, the autonomous drive instruction device 102 acquires an estimated parking location. The estimated parking location is determined arbitrarily by the user.

In step S112, the running-state storage 60 stores the approach path 11 in front of the estimated parking location.

In step S113, the running-state storage 60 acquires and stores the information on the traffic regulations 9 on the approach path 11. The approach path 11 illustrated in FIG. 17 allows two-way traffic. In this way, the processing for storing an approach path ends.

After the processing for storing an approach path, for example, the user gets off the vehicle 1 and stays at a facility or any other place. When the user again gets on the vehicle 1, the user inputs an user instruction to the user terminal 130 at a given location in the parking lot. Thereby, each step illustrated in FIG. 7 is executed. Note that Embodiment 4 differs from Embodiment 2 in the details of processing for determining a leaving direction in step S20.

Figure 18:
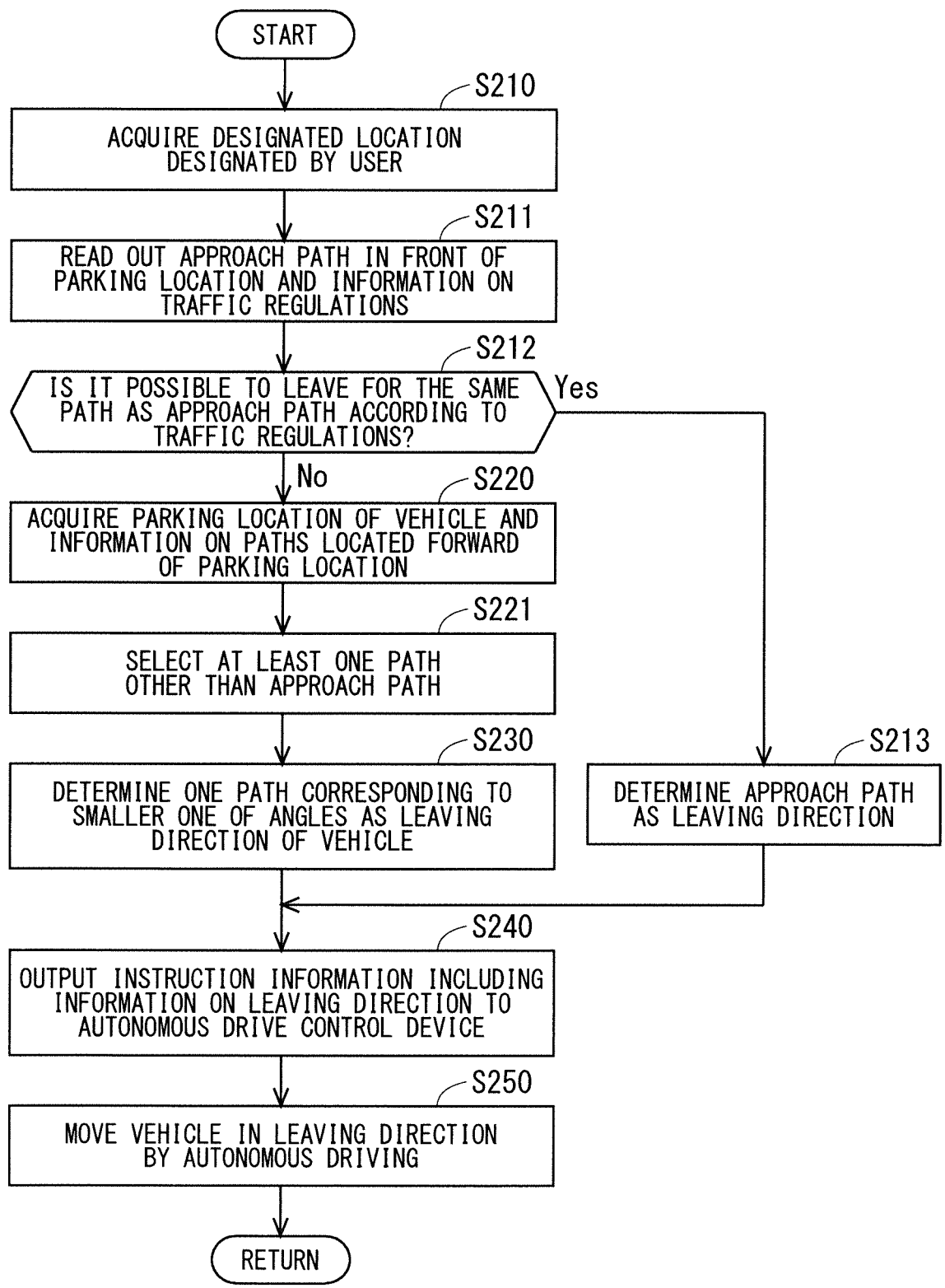
FIG. 18 is a flowchart illustrating details of processing for determining a leaving direction according to Embodiment 4.

FIG. 18 is a flowchart illustrating the details of the processing for determining a leaving direction according to Embodiment 4.

Step S210 is the same as step S210 illustrated in FIG. 9.

In step S211, the travel-direction determiner 10 reads out the approach path 11 in front of the parking location 3 and the information on the traffic regulations 9 from the running-state storage 60.

Figure 19:
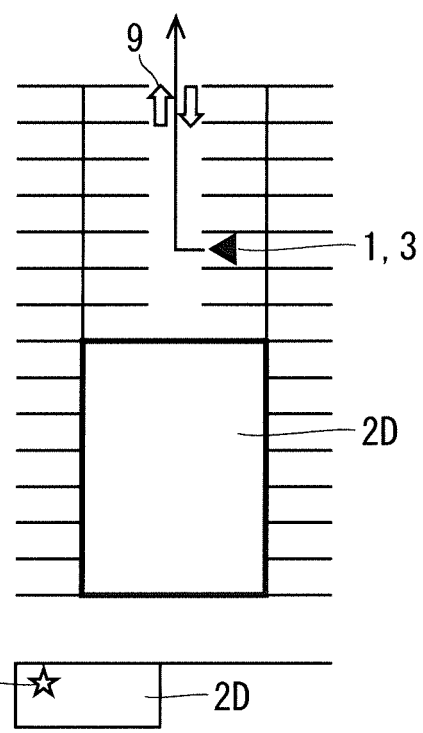
FIG. 19 is a diagram showing one example of the processing for determining a leaving direction.

In step S212, the travel-direction determiner 10 determines whether or not the vehicle can leave for the same path as the approach path 11 in accordance with the traffic regulations 9. If the vehicle can leave for the same path as the approach path 11, step S213 is executed. FIG. 19 is a diagram showing one example of the processing for determining a leaving direction. Since the approach path 11 allows two-way traffic, the vehicle 1 can leave for the same path as the approach path 11. On the other hand, although the parking lot is not illustrated, if the vehicle cannot leave for the same path as the approach path 11, step S220 is executed.

In step S213, the travel-direction determiner 10 determines the approach path 11 as the leaving direction.

In step S220, the travel-direction determiner 10 acquires the parking location 3 of the vehicle 1 and the information on the plurality of paths 6 in the branch area 5 located in front of the parking location 3.

In step S221, the travel-direction determiner 10 selects at least one path other than the approach path 11.

In step S230, the travel-direction determiner 10 determines one path corresponding to a smaller one the plurality of angles as the leaving direction of the vehicle 1. Note that, if there is only one path other than the approach path 11, that path other than the approach path 11 is determined as the leaving direction.

The subsequent steps including step S240 are the same as the corresponding steps illustrated in FIG. 9.

To summarize the above description, the autonomous drive instruction device 102 according to Embodiment 4 further includes the running-state storage 60. The running-state storage 60 stores the approach path 11 on which the vehicle 1 is travelling when entering the parking location 3, the approach path being in front of the parking location 3. The running-state storage 60 stores the information on the traffic regulations 9 prepared for the parking lot including the approach path 11 and recognized via the vehicle-mounted equipment 110 of the vehicle 1 travelling on the approach path 11. When the vehicle 1 leaves the parking location 3 and if the vehicle is determined to be capable of leaving for the same path as the approach path 11 in accordance with the traffic regulations 9 on the basis of the approach path 11 and the information on the traffic regulations 9 on the approach path 11, the travel-direction determiner 10 determines the approach path 11 as the one path, i.e., the travel direction of the vehicle 1.

When the vehicle leaves the parking location, there may be a physical obstruction or the traffic regulations 9 that cannot be recognized from the parking location 3 of the vehicle 1. FIG. 20 is a diagram showing another example of the processing for determining a leaving direction. In the case of FIG. 20 (as well as FIG. 19), there are multiple facility entrances 2D within the parking lot, one of which includes the designated location 4, and another of which may represent an obstacle to a potential leaving path (6I) of the vehicle. Particularly, in FIG. 20, the branch area 5 located forward of the parking location 3 branches out into two paths 6H and 6I that both allows two-way travel. However, if the path 6I is determined as the leaving direction from the relationship between the extension direction of the path and the designated-location direction 8, the path 6I runs dead at one of the facility entrances 2D that is ahead of the branch area 5. In such a situation, the autonomous drive instruction device 102 according to Embodiment 4 prioritizes the path 6H, which is the approach path 11, over the path 6I in determining the leaving direction, unless otherwise contrary to the traffic regulations 9 that limits the leaving direction. Since there is no physical obstruction on the approach path 11, the autonomous drive instruction device 102 can smoothly move the vehicle out of the parking location. Accordingly, the autonomous drive instruction device 102 can shorten the time required for the vehicle 1 to arrive at the designated location 4.

Embodiment 5

An autonomous drive instruction device and an autonomous drive instruction method according to Embodiment 5 will be described. Embodiment 5 is a subordinate concept of Embodiment 1, and the autonomous drive instruction device according to Embodiment 5 includes each constituent element of the autonomous drive instruction device 100 according to Embodiment 1. Note that descriptions of constituent elements and operations that are similar to any of Embodiments 1 to 4 shall be omitted.

The autonomous drive instruction device according to Embodiment 5 has the same configuration as the autonomous drive instruction device 102 according to Embodiment 4. However, Embodiment 5 differs in the functions of the running-state storage 60 and the travel-direction determiner 10.

The running-state storage 60 stores the approach path 11 and the information on the traffic regulations 9 on the approach path 11, the approach path 11 being a path on which the vehicle 1 travels from the parking entrance 2A to the parking location 3 when entering the parking location 3. The traffic regulations 9 are traffic regulations 9 prepared in advance for the parking lot. Here, the camera-information acquirer 40 extracts the information on the traffic regulations 9 on the approach path 11, on the basis of the image of the scene forward of the vehicle 1, captured by the camera 111. The running-state storage 60 acquires and stores the information on the traffic regulations 9 extracted by the camera-information acquirer 40.

The travel-direction determiner 10 selects at least one path navigable by the vehicle 1 in accordance with the traffic regulations 9 from among the plurality of paths 6, on the basis of the information on the plurality of paths 6 located forward of the current location of the vehicle 1 and the information on the traffic regulations 9 on the approach path 11, stored in the running-state storage 60. If there are two or more paths navigable by the vehicle 1 in accordance with the traffic regulations 9, the travel-direction determiner 10 obtains two or more angles formed by the extension directions of the two or more paths and the designated-location direction 8. The travel-direction determiner 10 determines one path corresponding to an extension direction that forms a smaller one of the two or more angles, as the travel direction of the vehicle 1. If there is only one path navigable by the vehicle 1 in accordance with the traffic regulations 9, the travel-direction determiner 10 determines this one path as the travel direction of the vehicle 1.

The functions of the running-state storage 60 and the travel-direction determiner 10 according to Embodiment 5 are implemented by the processor 91 illustrated in FIG. 3 or 6 executing programs stored in the memory 92. The storage function of the running-state storage 60 is implemented by, for example, the memory 92.

In the autonomous drive instruction method according to Embodiment 5, the following processing for storing an approach path is executed before step S10 illustrated in FIG. 7.

Figure 21:
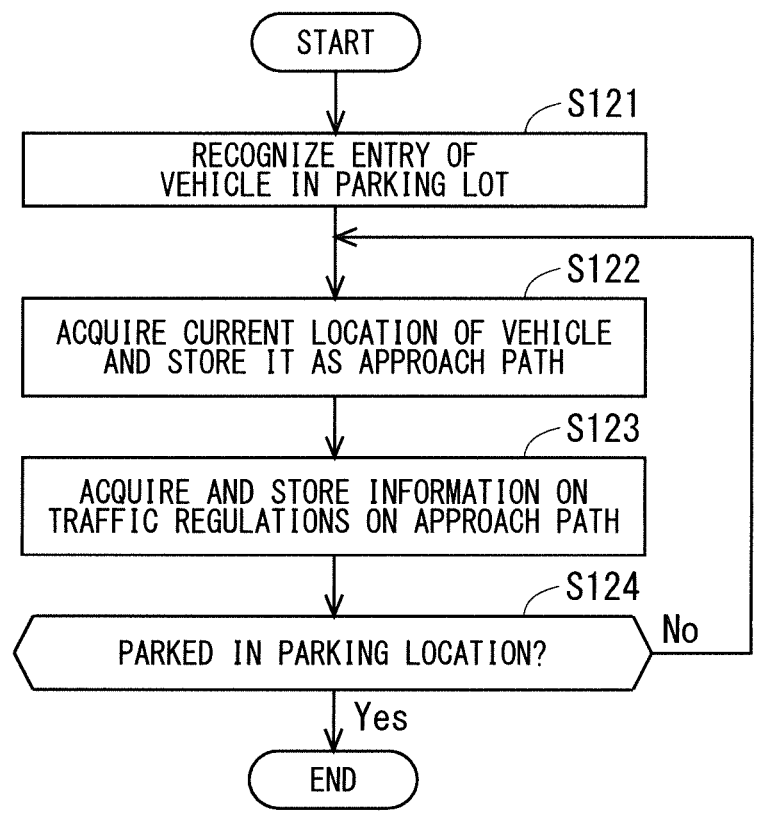
FIG. 21 is a flowchart illustrating processing for storing an approach path according to Embodiment 5.
Figure 22:
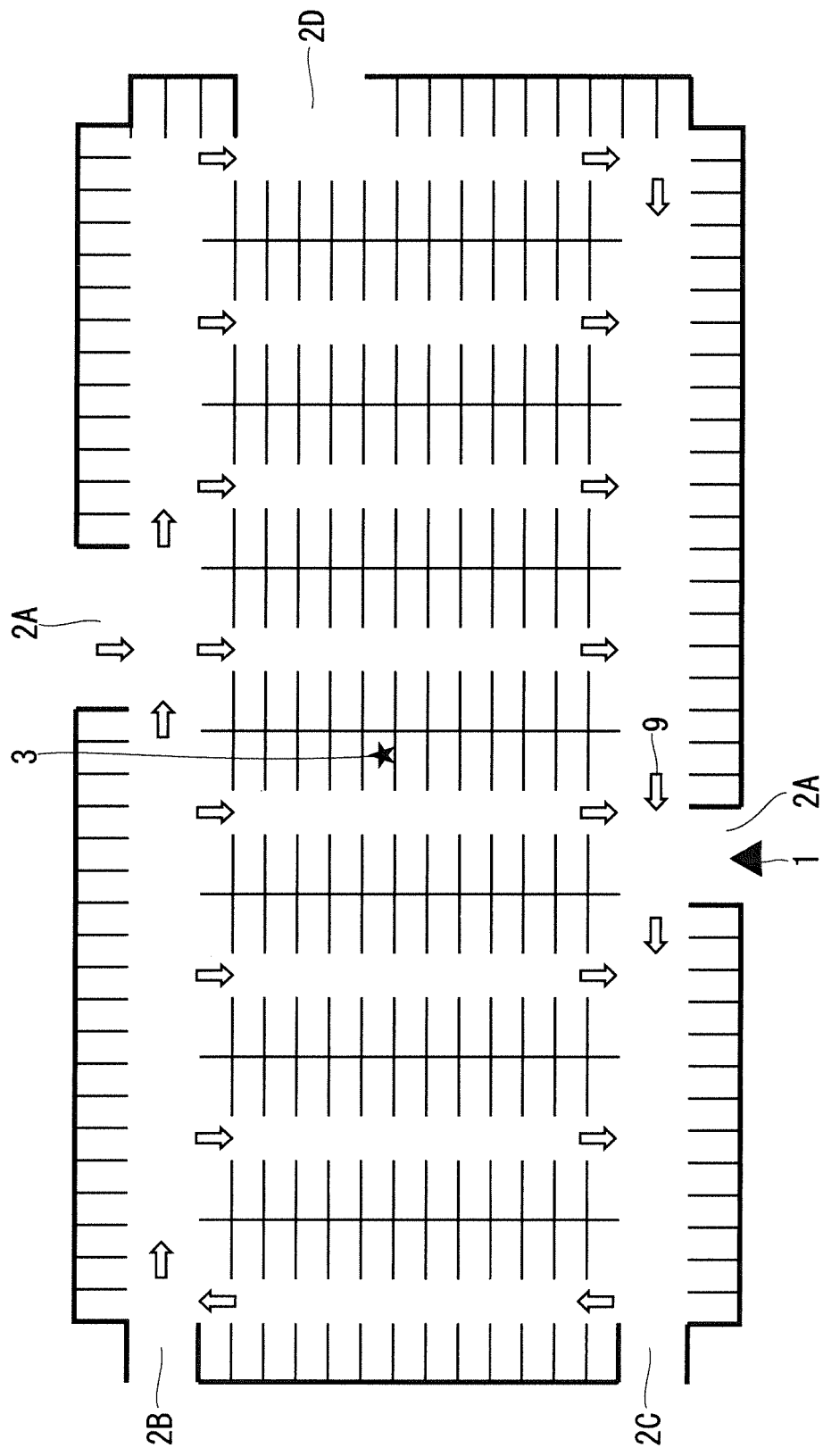
FIG. 22 is a diagram illustrating a parking lot and traffic regulations in a parking lot.

FIG. 21 is a flowchart illustrating the processing for storing an approach path according to Embodiment 5. FIG. 22 is a diagram illustrating a parking lot and the traffic regulations 9 prepared for the parking lot. The following description is given of the case where the vehicle 1 travels from a parking entrance 2A to the parking location 3.

In step S121, the autonomous drive instruction device recognizes the entry of the vehicle from the parking entrance 2A. For example, the autonomous drive instruction device determines that the vehicle has entered the parking entrance 2A, on the basis of the current location of the vehicle 1 acquired by the current-location acquirer 50 and map information of an area outside the parking lot. Alternatively, for example, the autonomous drive instruction device may determine the entry of the vehicle into the parking entrance 2A upon receipt of a notification received by the communicator 30 and transmitted from the user terminal 130.

In step S122, the running-state storage 60 acquires the current location of the vehicle 1 and stores the location as the approach path 11.

In step S123, the running-state storage 60 acquires and stores the information on the traffic regulations 9 on the approach path 11. The running-state storage 60 stores the information on the traffic regulations 9 within a recognizable range from the parking entrance 2A, together with the approach path 11, via the camera-information acquirer 40 or other element.

In step S124, the autonomous drive instruction device determines whether or not the vehicle 1 has parked at the parking location 3. When the vehicle 1 has parked at the parking location 3, the processing for storing the approach path ends. If the vehicle 1 has not parked at the parking location 3, step S122 is executed again. That is, when the vehicle 1 has not been parked yet, steps S122 and S123 are repeated until the parking of the vehicle 1 is completed.

Figure 23:
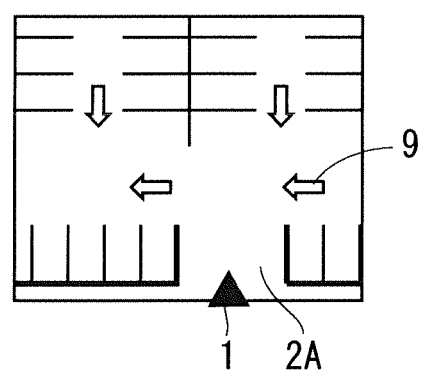
FIG. 23 is a diagram illustrating information on traffic regulations at one location on an approach path.
Figure 24:
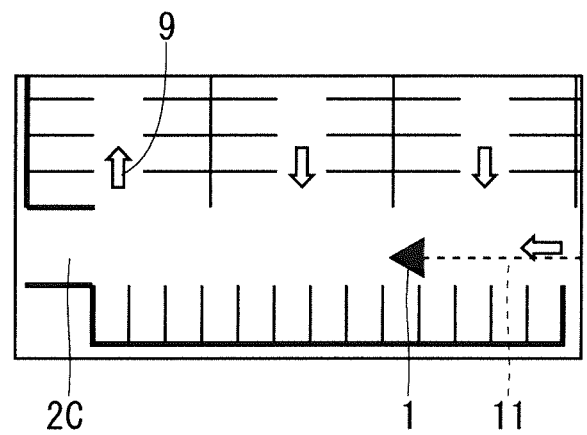
FIG. 24 is a diagram illustrating information on traffic regulations at one location on an approach path.
Figure 25:
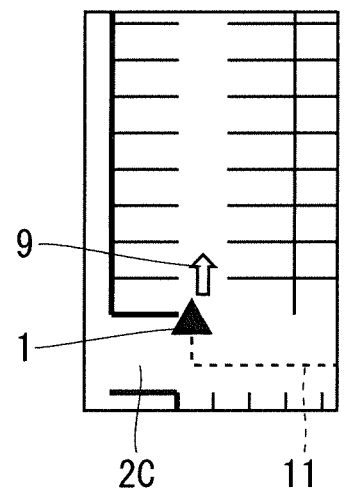
FIG. 25 is a diagram illustrating information on traffic regulations at one location on an approach path.
Figure 26:
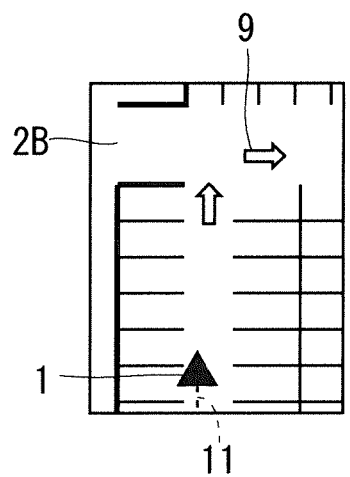
FIG. 26 is a diagram illustrating information on traffic regulations at one location on an approach path.
Figure 27:
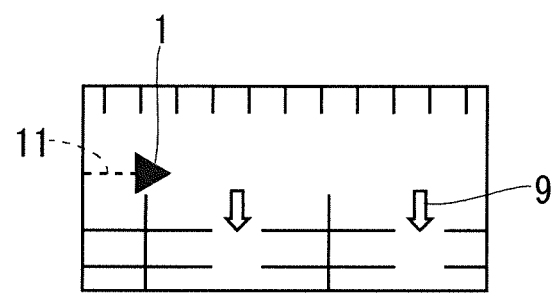
FIG. 27 is a diagram illustrating information on traffic regulations at one location on an approach path.
Figure 28:
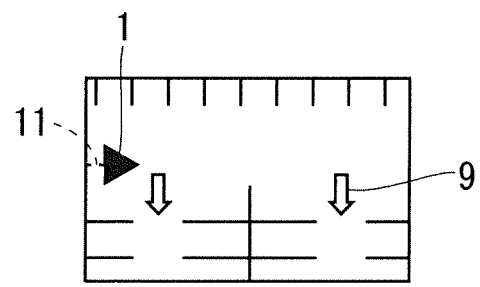
FIG. 28 is a diagram illustrating information on traffic regulations at one location on an approach path.
Figure 29:
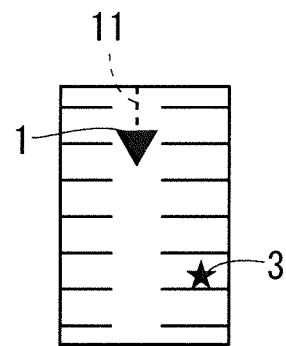
FIG. 29 is a diagram illustrating information on traffic regulations at one location on an approach path.
Figure 30:
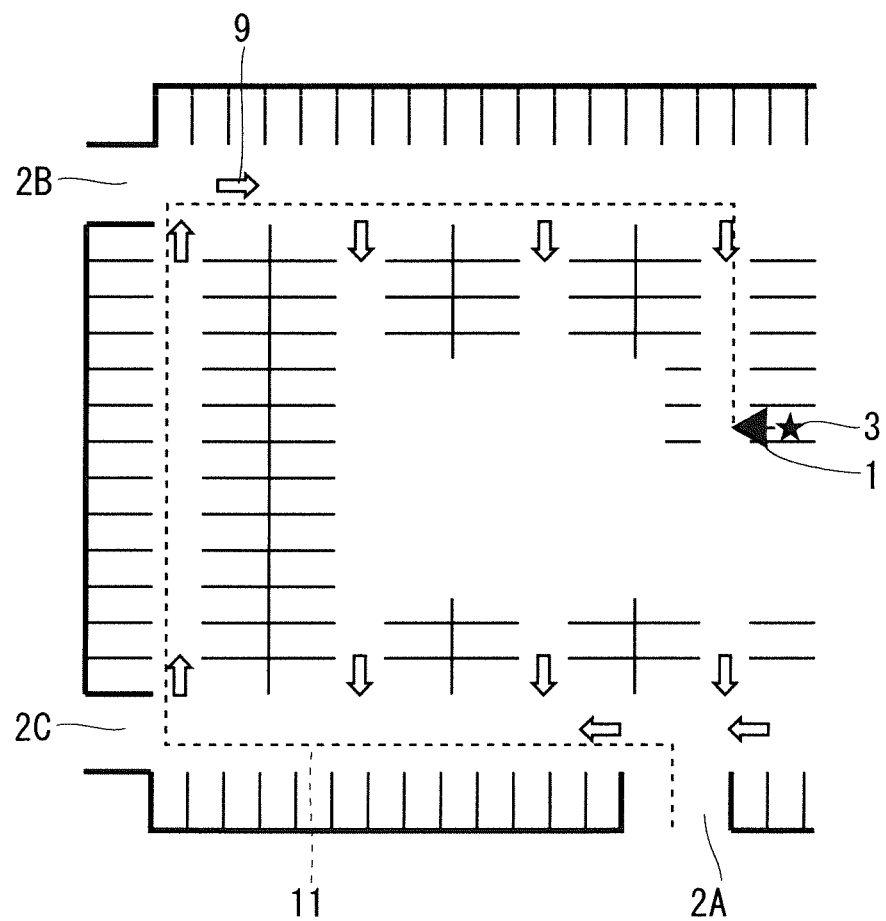
FIG. 30 is a diagram illustrating map information including information on traffic regulations on an approach path.

FIG. 23 is a diagram illustrating the information on the traffic regulations 9 at one location on the approach path 11. In FIG. 23, the one location on the approach path 11 corresponds to the parking entrance 2A. The running-state storage 60 stores the information illustrated in FIG. 23 for the parking entrance 2A. Similarly, FIGS. 24 to 29 are diagrams each illustrating the information on the traffic regulations 9 at one location on the approach path 11, stored in the running-state storage 60. The running-state storage 60 stores the information on the traffic regulations 9 at each location illustrated in FIGS. 23 to 29. Then, the running-state storage 60 connects these pieces of information so as to store map information including the information on the traffic regulations 9 on the approach path 11. FIG. 30 is a diagram illustrating the map information on the approach path 11.

After the processing for storing an approach path, for example, the user gets off the vehicle 1 and stays at a facility or any other place. When the user again gets on the vehicle 1, the user inputs a user instruction to the user terminal 130 at a given location in the parking lot. Thereby, each step illustrated in FIG. 7 is executed. However, Embodiment 5 differs from Embodiment 2 in the details of the processing for determining a travel direction in step S40. Although not described, in step S20 of Embodiment 5, the processing for determining a leaving direction, described in Embodiment 4, may be executed.

Figure 31:
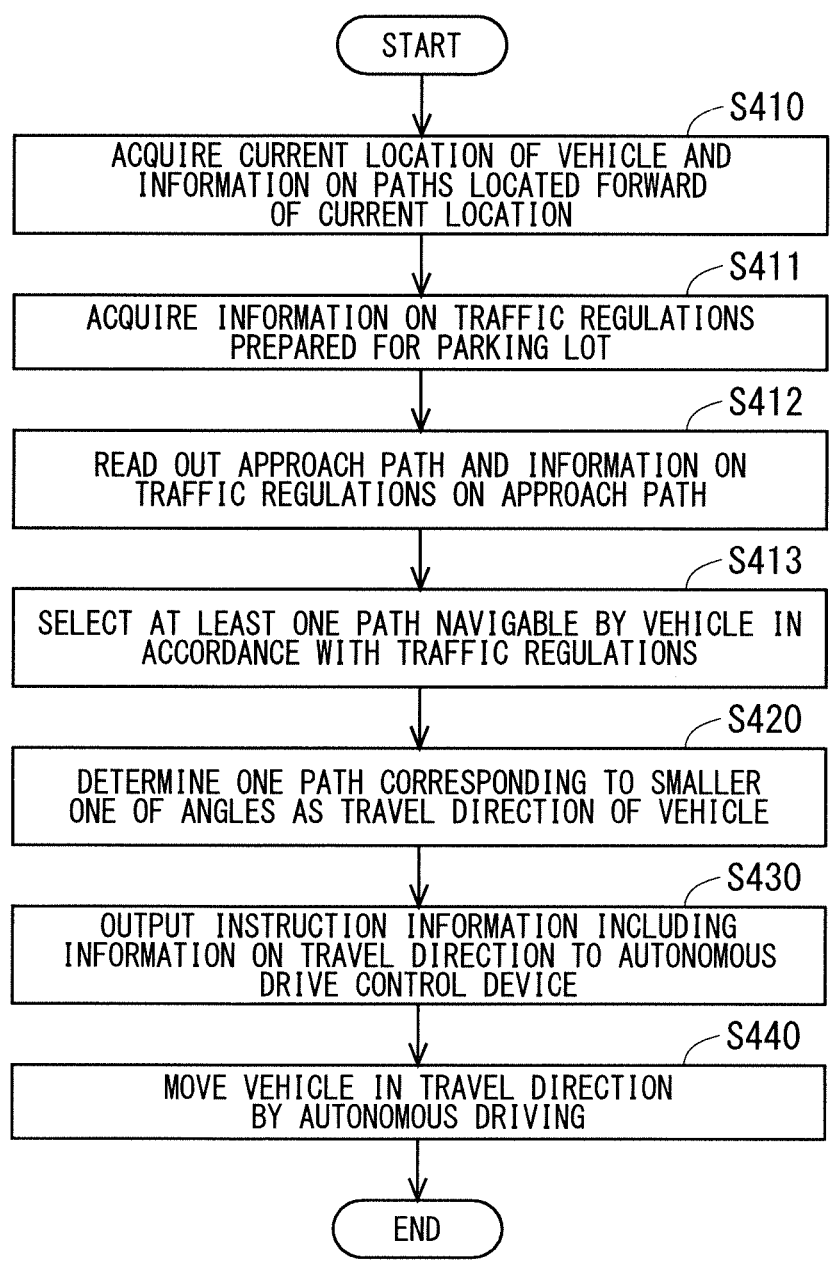
FIG. 31 is a flowchart illustrating details of processing for determining a travel direction according to Embodiment 5.

FIG. 31 is a flowchart illustrating the details of the processing for determining a travel direction according to Embodiment 5. Steps S410 and S411 are the same as those in the processing for determining a travel direction illustrated in FIG. 13.

In step S412, the travel-direction determiner 10 reads out the approach path 11 and the information on the traffic regulations 9 on the approach path 11 from the running-state storage 60.

The subsequent steps including step S413 are the same as those of the processing for determining a travel direction illustrated in FIG. 13.

To summarize the above, the autonomous drive instruction device according to Embodiment 5 further includes the running-state storage 60. The running-state storage 60 stores the approach path 11 and the information on the traffic regulations 9 on the approach path 11, the approach path 11 being a path on which the vehicle 1 travels from the parking entrance 2A to the parking location 3 when entering to be parked at the parking location 3, and the traffic regulations 9 being prepared for the parking lot including the approach path 11 and recognized via the vehicle-mounted equipment 110 of the vehicle 1 travelling on the approach path 11. The travel-direction determiner 10 selects at least one path navigable by the vehicle 1 in accordance with the traffic regulations 9 from among the plurality of paths 6, on the basis of the information on the plurality of paths 6, the approach path 11, and the information on the traffic regulations 9 on the approach path 11. The one path is included in at least one path navigable by the vehicle 1.

This autonomous drive instruction device acquires the traffic regulations 9 on the approach path 11 and generates the map information. Since the autonomous drive instruction device determines the travel direction on the basis of the map information, the vehicle 1 can arrive at the designated location 4 without taking a needless roundabout way. That is, the autonomous drive instruction device makes it possible to determine the travel direction with high precision on the path to the designated location 4.

Embodiment 6

An autonomous drive instruction device and an autonomous drive instruction method according to Embodiment 6 will be described. Embodiment 6 is a subordinate concept of Embodiment 1, and the autonomous drive instruction device according to Embodiment 6 includes each constituent element of the autonomous drive instruction device 100 according to Embodiment 1. Note that descriptions of constituent elements and operations that are similar to those of any of Embodiments 1 to 5 shall be omitted.

Figure 32:
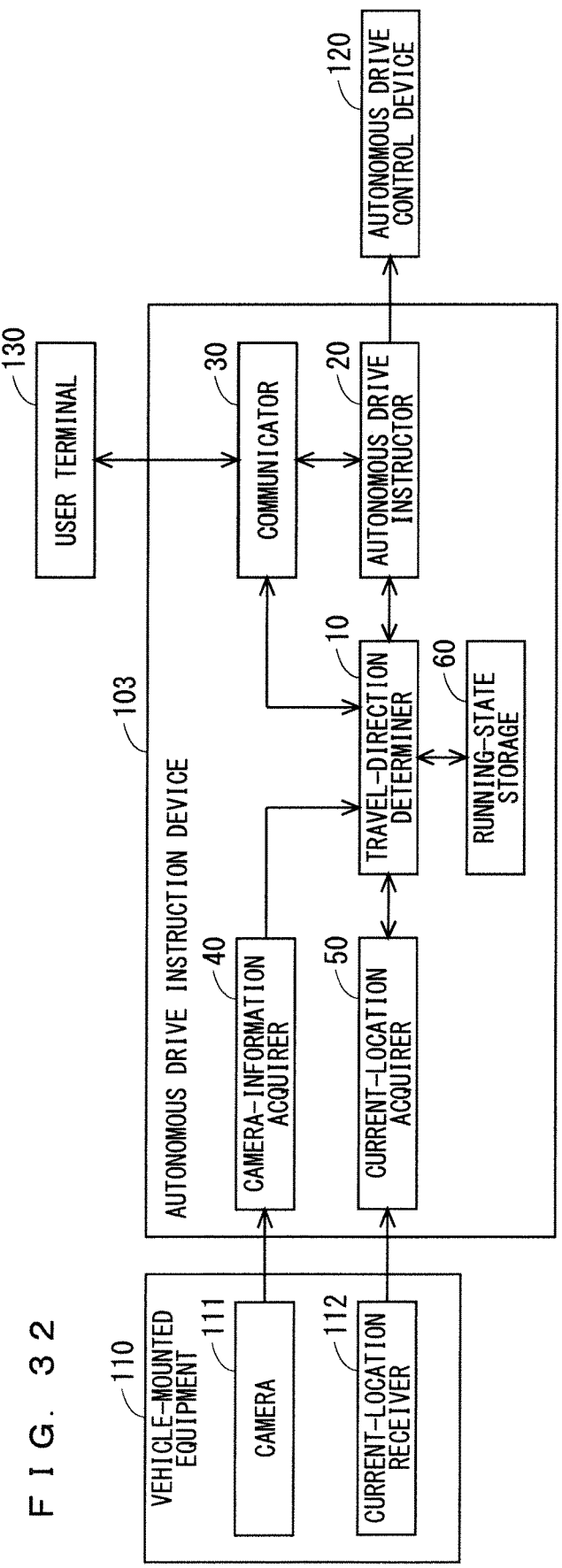
FIG. 32 is a block diagram illustrating a configuration of an autonomous drive instruction device according to Embodiment 6.

FIG. 32 is a block diagram illustrating a configuration of the autonomous drive instruction device 103 according to Embodiment 6.

The travel-direction determiner 10 determines a stop direction of the vehicle 1 at the designated location 4 on the basis of a designated stop direction designated by the user and the information on the traffic regulations 9 in front of the designated location 4. The traffic regulations 9 in front of the designated location 4 is recognized via the vehicle-mounted equipment 110 of the vehicle 1 travelling in front of the designated location 4.

The autonomous drive instructor 20 outputs instruction information including information on the stop direction to the autonomous drive control device 120 such that the autonomous drive control device 120 performs control to stop the vehicle 1 at the designated location 4 in the stop direction determined by the travel-direction determiner 10.

The functions of the travel-direction determiner 10 and the autonomous drive instructor 20 according to Embodiment 6 are implemented by the processor 91 illustrated in FIG. 3 or 6 executing programs stored in the memory 92.

Figure 33:
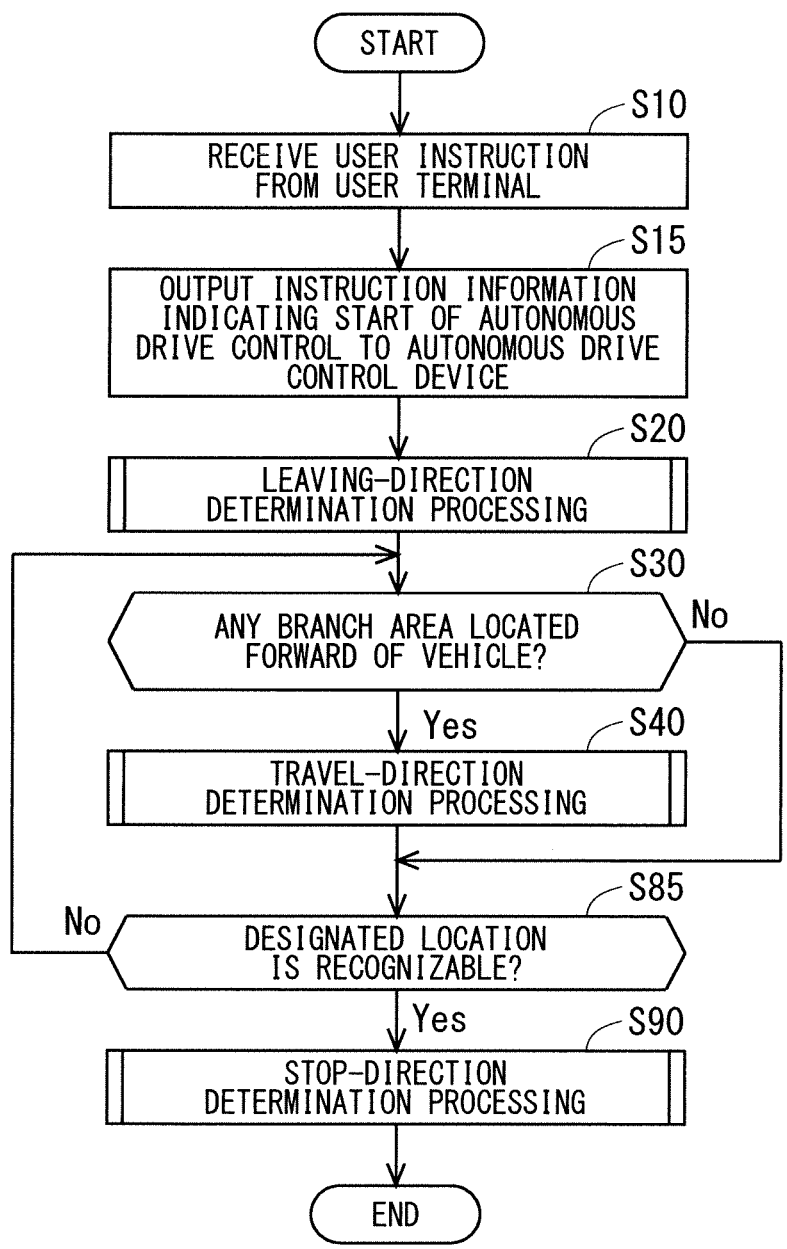
FIG. 33 is a flowchart illustrating operations of the autonomous drive instruction device and an autonomous drive instruction method according to Embodiment 6.

FIG. 33 is a flowchart illustrating operations of the autonomous drive instruction device 103 and the autonomous drive instruction method according to Embodiment 6.

Step S10 to S40 are the same as those illustrated in FIG. 7. In Embodiment 6, step S85 is executed after step S40. In step S30, even if there is no branch area 5 located forward of the vehicle 1, step S85 is executed, instead of step S80.

In step S85, the travel-direction determiner 10 determines whether or not the designated location 4 is recognizable. The travel-direction determiner 10 determines whether or not the designated location 4 is recognizable on the basis of, for example, the current location of the vehicle 1, the designated location 4, and the image of the scene forward of the vehicle 1. For example, when it can be recognized that the vehicle 1 has arrived in front of the designated location 4, the travel-direction determiner 10 determines that the designated location 4 is recognizable. When the designated location 4 is recognizable, step S90 is executed. When the designated location 4 is not recognizable, step S30 is executed again.

In step S90, the processing for determining a stop direction is executed.

Figure 34:
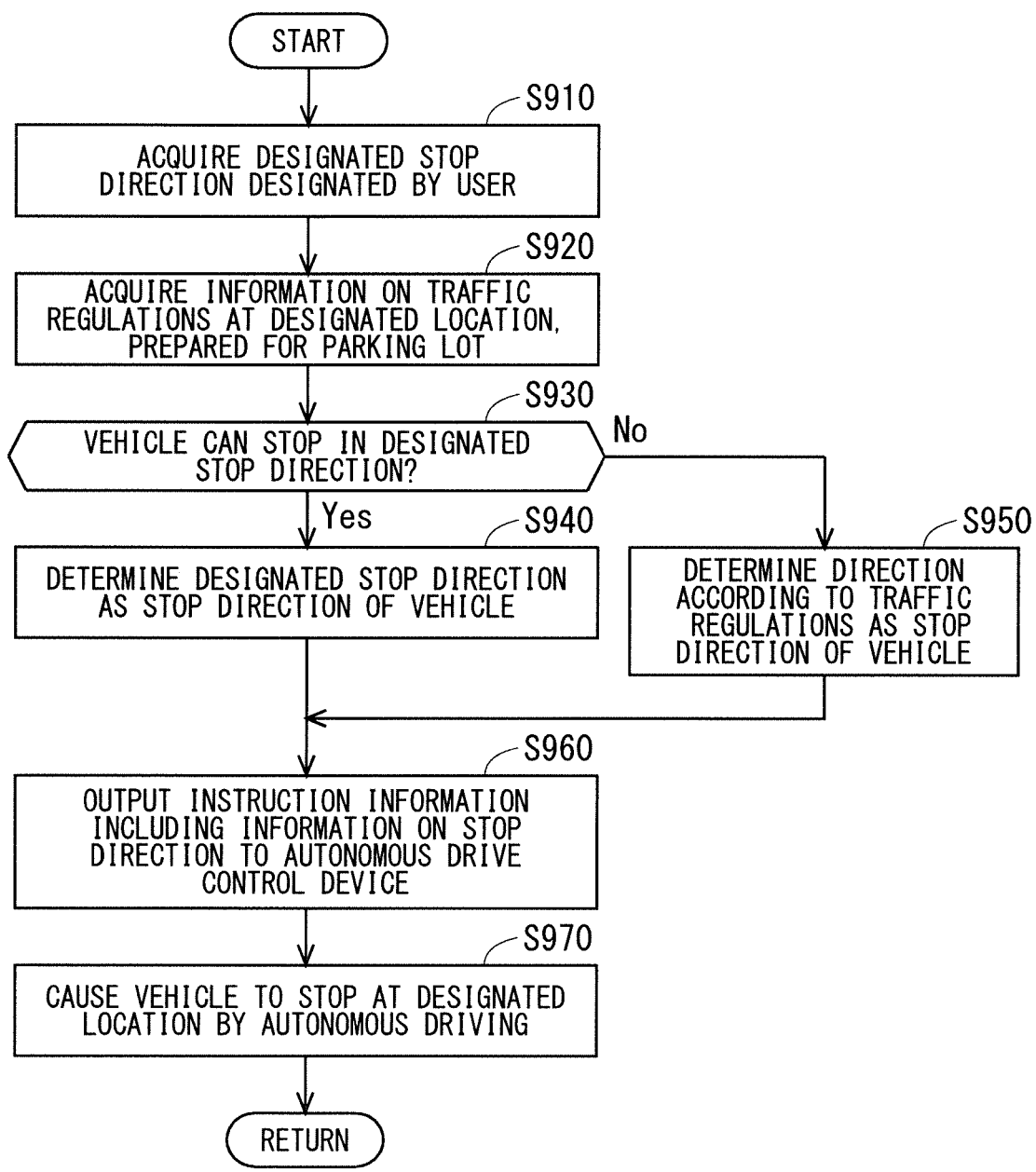
FIG. 34 is a flowchart illustrating details of processing for determining a stop direction according to Embodiment 6.

FIG. 34 is a flowchart illustrating details of the processing for determining a stop direction according to Embodiment 6.

In step S910, the travel-direction determiner 10 acquires the designated stop direction designated by the user. The designated stop direction is, for example, included in the aforementioned user instruction. If nothing has been designated by the user, the travel-direction determiner 10 determines the direction in which the vehicle 1 is parked on the left side of the designated location 4 as the designated stop direction.

In step S920, the travel-direction determiner 10 acquires the information on the traffic regulations 9 at the designated location 4, prepared for the parking lot. For example, the camera 111 captures an image of a scene forward of the vehicle 1. The camera-information acquirer 40 extracts the information on the traffic regulations 9 at the designated location 4 on the basis of markings or signs included in the captured image. The travel-direction determiner 10 acquires the information on the traffic regulations 9 from the camera-information acquirer 40.

In step S930, the travel-direction determiner 10 determines whether or not the vehicle 1 can be stopped in the designated stop direction. If the vehicle 1 can be stopped in the designated stop direction, step S940 is executed. If the vehicle 1 cannot be stopped in the designated stop direction, step S950 is executed.

In step S940, the travel-direction determiner 10 determines the designated stop direction as the stop direction of the vehicle 1.

In step S950, the travel-direction determiner 10 determines the direction according to the traffic regulations 9 as the stop direction of the vehicle 1.

In step S960, the autonomous drive instructor 20 outputs instruction information including the information on the stop direction to the autonomous drive control device 120.

In step S970, the autonomous drive control device 120 causes the vehicle 1 to stop at the designated location 4 by autonomous driving. In this way, the processing for determining a stop direction and the autonomous drive instruction method end.

To summarize the above description, the travel-direction determiner 10 of the autonomous drive instruction device 103 according to Embodiment 6 determines the stop direction of the vehicle 1 at the designated location 4 on the basis of the designated stop direction and the information on the traffic regulations 9, the designated stop direction being the direction designated by the user and being the stop direction of the vehicle 1 at the designated location 4, and the traffic regulations 9 being the traffic regulations 9 at the designated location 4, prepared for the parking lot, and recognized via the vehicle-mounted equipment 110 of the vehicle 1 that travels in front of the designated location 4. The autonomous drive instructor 20 outputs instruction information including the information on the stop direction to the autonomous drive control device 120 so as to control the vehicle 1 to stop in the stop direction at the designated location 4.

A door of the vehicle 1 that is required to be brought close to the designated location 4 varies depending on, for example, environments around the designated location 4, conditions of the user, and conditions of fellow passengers. For example, when the user carries a large amount of loads at the facility entrance 2D, the vehicle 1 preferably stops in such a way that the door of the trunk room of the vehicle is closest as it approaches the designated location 4. The autonomous drive instruction device 103 according to Embodiment 6 enables the user to stop the vehicle 1 in the designated stop direction, unless otherwise contrary to the traffic regulations 9 that limit the stop direction. The vehicle 1 stops in an optimum direction depending on, for example, environments around the designated location 4, conditions of the user, and conditions of fellow passengers.

Embodiment 7

An autonomous drive instruction device and an autonomous drive instruction method according to Embodiment 7 will be described. Embodiment 7 is a subordinate concept of Embodiment 1, and the autonomous drive instruction device according to Embodiment 7 includes each constituent element of the autonomous drive instruction device 100 according to Embodiment 1. Note that descriptions of constituent elements and operations that are similar to those of any of Embodiments 1 to 6 shall be omitted.

In the case where there is a traffic obstruction that disables the passage of the vehicle 1 in front of the vehicle 1 during travel on the path determined as the travel direction, the travel-direction determiner 10 determines the direction returning to the immediately previous branch area 5 as the travel direction of the vehicle 1. That is, the travel-direction determiner 10 determines, as the travel direction of the vehicle 1, the direction returning to the branch area 5 at which the one path has been determined as the travel direction. The traffic obstruction as used herein refers to an obstruction that occurs suddenly and that physically disables the entry of the vehicle. The traffic obstruction includes, for example, breakdowns in the other vehicles, accidents, and constructions.

The travel-direction determiner 10 selects a path other than the one path with the traffic obstruction from among the plurality of paths 6 in the branch area 5 to which the vehicle 1 has returned from the one path with the traffic obstruction, and determines the selected path as the travel direction of the vehicle 1.

The running-state storage 60 stores a travel path that is the path on which the vehicle travels from the parking entrance 2A to the parking location 3, and information on the traffic obstruction on the one path. Although the running-state storage according to Embodiment 5 stores the map information on the approach path 11, similarly, the running-state storage 60 according to Embodiment 7 stores the travel path and map information including information on the traffic regulations 9 at each location on the travel path. Moreover, the running-state storage 60 also stores the information on the traffic obstruction in association with the one path where the traffic obstruction has occurred, i.e., in addition to the map information. The information on the traffic obstruction is, for example, information indicating "road closed to vehicle (no entry)".

The function of the travel-direction determiner 10 according to Embodiment 7 is executed by the processor 91 illustrated in FIG. 3 or 6 executing programs stored in the memory 92. The storage function of the running-state storage 60 is implemented by, for example, the memory 92.

Figure 35:
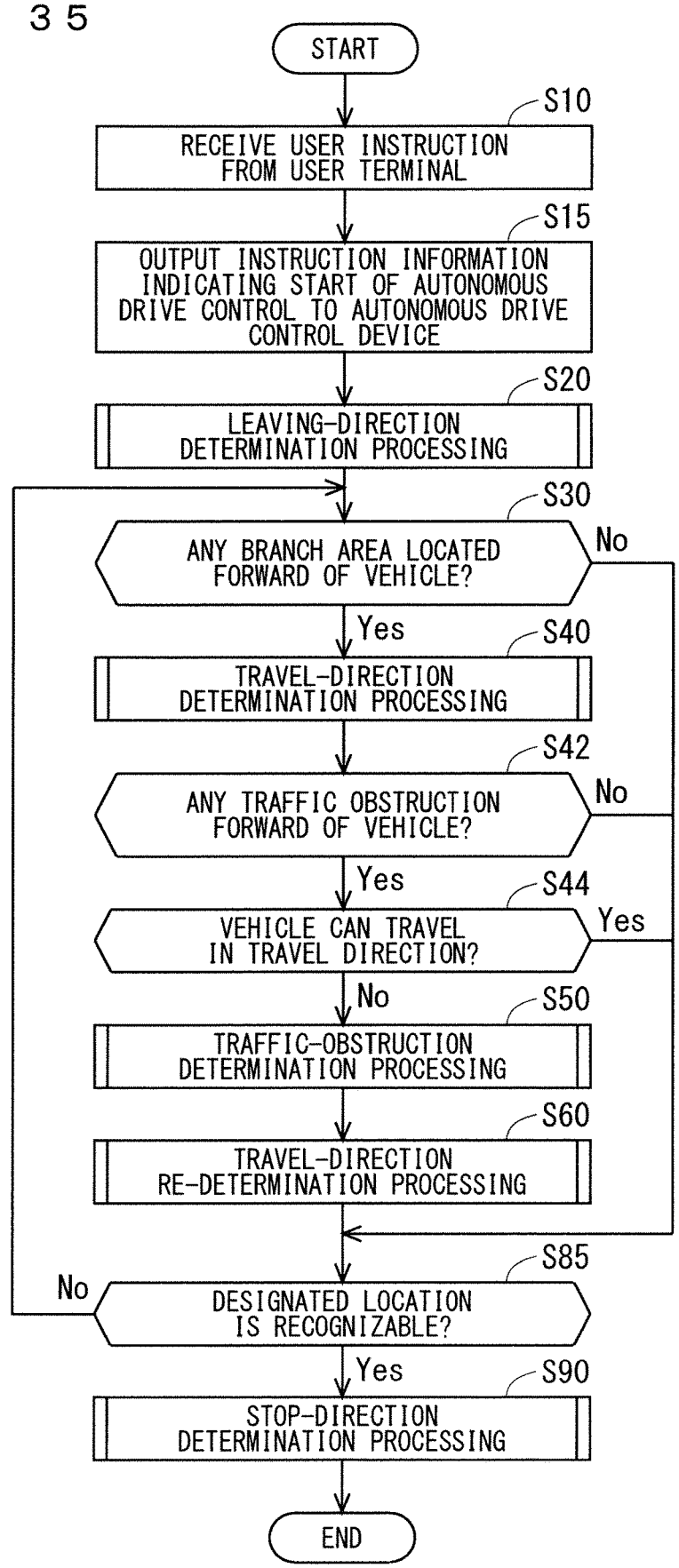
FIG. 35 is a flowchart illustrating operations of an autonomous drive instruction device and an autonomous drive instruction method according to Embodiment 7.

FIG. 35 is a flowchart illustrating operations of the autonomous drive instruction device and the autonomous drive instruction method according to Embodiment 7.

Steps S10 to S40 are the same as those illustrated in FIG. 33.

In step S42, the travel-direction determiner 10 determines whether or not there is a traffic obstruction in front of the vehicle 1. For example, the travel-direction determiner 10 acquires the image of a scene forward of the vehicle 1, captured by the camera 111, from the camera-information acquirer 40 and determiners whether or not there is a traffic obstruction on the basis of the captured image. If there is a traffic obstruction, step S44 is executed. If there is no traffic obstruction, step S85 is executed.

In step S44, the travel-direction determiner 10 determines whether or not the vehicle 1 can travel in the travel direction. For example, the travel-direction determiner 10 determines whether or not the vehicle 1 can travel while avoiding the traffic obstruction, on the basis of the image of the scene forward of the vehicle 1, captured by the camera 111. If the vehicle 1 cannot travel in the travel direction, step S50 is executed. If the vehicle 1 can travel in the travel direction, step S85 is executed.

In step S50, processing for determining a traffic obstruction is executed. Details thereof will be described later.

In step S60, processing for re-determining a travel direction is executed. Details thereof will be described later.

The subsequent steps including step S85 are the same as those illustrated in FIG. 33.

Figure 36:
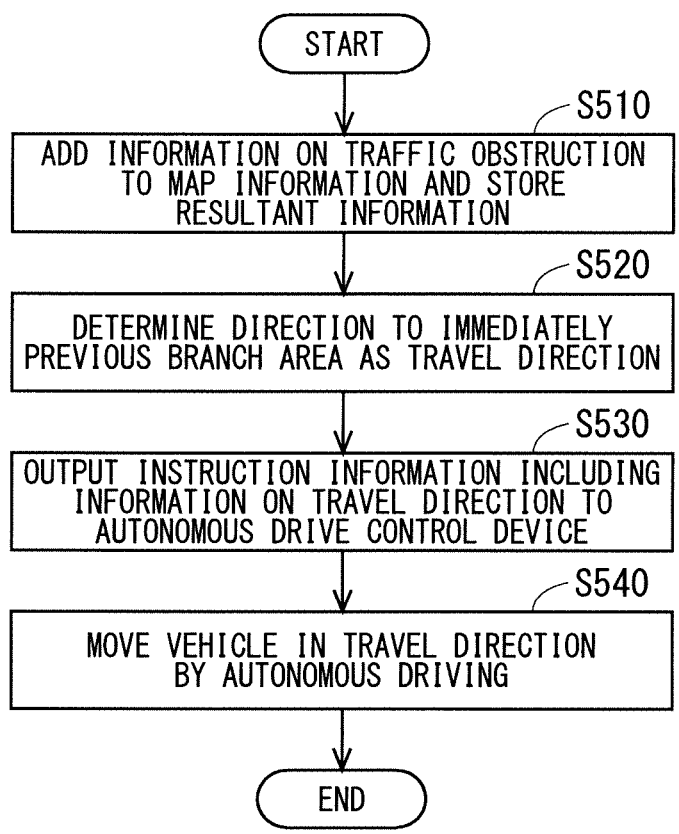
FIG. 36 is a flowchart illustrating details of processing for determining a traffic obstruction according to Embodiment 7.

FIG. 36 is a flowchart illustrating the details of the processing for determining a traffic obstruction according to Embodiment 7.

In step S510, the running-state storage 60 adds and stores information on the traffic obstruction to the map information on the travel path.

In step S520, the travel-direction determiner 10 determines the direction returning to the immediately previous branch area 5 as the travel direction.

In step S530, the autonomous drive instructor 20 outputs instruction information including information on the travel direction to the autonomous drive control device 120.

In step S540, the autonomous drive control device 120 moves the vehicle 1 in the travel direction by autonomous driving. In this way, the processing for determining a traffic obstruction ends.

Figure 37:
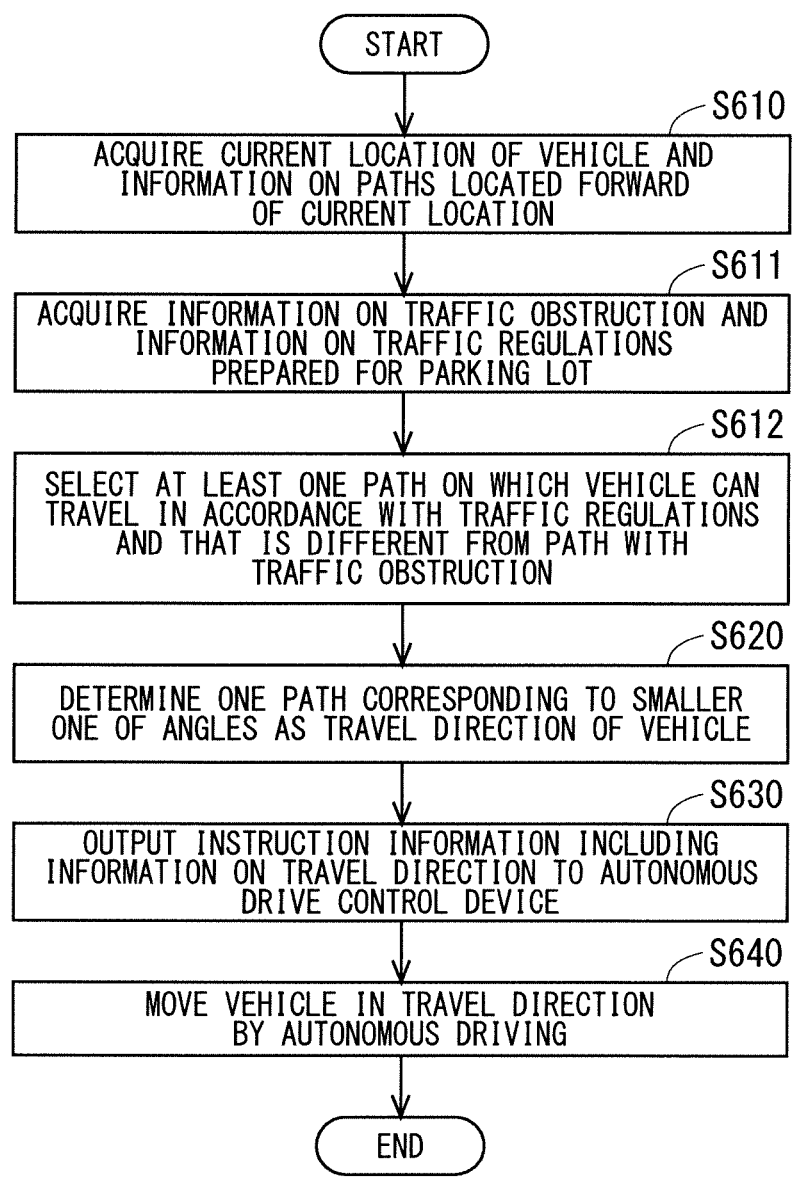
FIG. 37 is a flowchart illustrating details of processing for re-determining a travel direction according to Embodiment 7.

FIG. 37 is a flowchart illustrating the details of the processing for re-determining a travel direction according to Embodiment 7.

In step S610, the travel-direction determiner 10 acquires the current location of the vehicle 1 and the information on the plurality of paths 6 in the branch area 5 located forward of the current location.

In step S611, the travel-direction determiner 10 acquires the information on the traffic regulations 9 prepared for the parking lot and the information on the traffic obstruction. At this time, the travel-direction determiner 10 acquires the information on the traffic regulations 9 prepared for the plurality of paths 6, on the basis of the image of a scene forward of the vehicle 1, captured by the camera 111. The travel-direction determiner 10 also acquires the information on the traffic obstruction from the running-state storage 60.

In step S612, the travel-direction determiner 10 selects at least one path on which the vehicle 1 can travel in accordance with the traffic regulations 9 and that is different from the path with the traffic obstructions. The travel-direction determiner 10 obtains an extension direction of at least one path selected. The travel-direction determiner 10 also obtains the designated-location direction 8 from the branch area 5 to the designated location 4.

In step S620, the travel-direction determiner 10 determines one path corresponding to a smaller one of a plurality of angles as the travel direction of the vehicle 1. If there are two or more paths selected in step S612, the travel-direction determiner 10 determines, as the travel direction of the vehicle 1, one path corresponding to a smaller one of the two or more angles formed by the designated-location direction 8 and the extension directions of the two or more paths. If there is only one path selected in step S612, the travel-direction determiner 10 determines the one path as the travel direction of the vehicle 1.

In step S630, the autonomous drive instructor 20 outputs instruction information including information on the travel direction to the autonomous drive control device 120.

In step S640, the autonomous drive control device 120 causes the vehicle 1 to move in the travel direction by autonomous driving.

To summarize the above description, in the case where there is a traffic obstruction that disables the passage of the vehicle 1 on one path, the travel-direction determiner 10 of the autonomous drive instruction device according to Embodiment 7 determines, as the travel direction of the vehicle 1, the direction returning to the branch area 5 in which the one path has been determined as the travel direction. Then, the travel-direction determiner 10 selects a path other than the one path with the traffic obstruction from among the plurality of paths 6 in the branch area 5 to which the vehicle 1 has been returned, determines the selected path as the travel direction of the vehicle 1.

There are cases where the vehicle 1 cannot travel on the path determined as the travel direction of the vehicle 1 due to a sporadic accident or failure. If it takes time to remove the traffic obstruction, the vehicle 1 will arrive late at the designated location 4. The autonomous drive instruction device according to Embodiment 7 outputs instruction information indicating the vehicle 1 to return to the immediately previous branch point to the autonomous drive control device 120 and re-determines the other path as the travel direction. Accordingly, the autonomous drive instruction device can avoid a situation where the user has to wait for a long time at the designated location 4.

Embodiment 8

An autonomous drive instruction device and an autonomous drive instruction method according to Embodiment 8 will be described. Embodiment 8 is a subordinate concept of Embodiment 1, and the autonomous drive instruction device according to Embodiment 8 includes each constituent element of the autonomous drive instruction device 100 according to Embodiment 1. Note that descriptions of constituent elements and operations that are similar to those of any of Embodiments 1 to 7 shall be omitted.

The communicator 30 notifies the user of the information on the traffic obstruction and the current location of the vehicle 1 stopping on one path due to the presence of the traffic obstruction in front of the vehicle 1. This function of the communicator 30 is implemented by the processor 91 illustrated in FIG. 3 or 6 executing programs stored in the memory 92.

Operations of the autonomous drive instruction device and the autonomous drive instruction method according to Embodiment 8 differ from those of Embodiment 7 in the details of the processing for determining a traffic obstruction in step S50 illustrated in FIG. 35.

Figure 38:
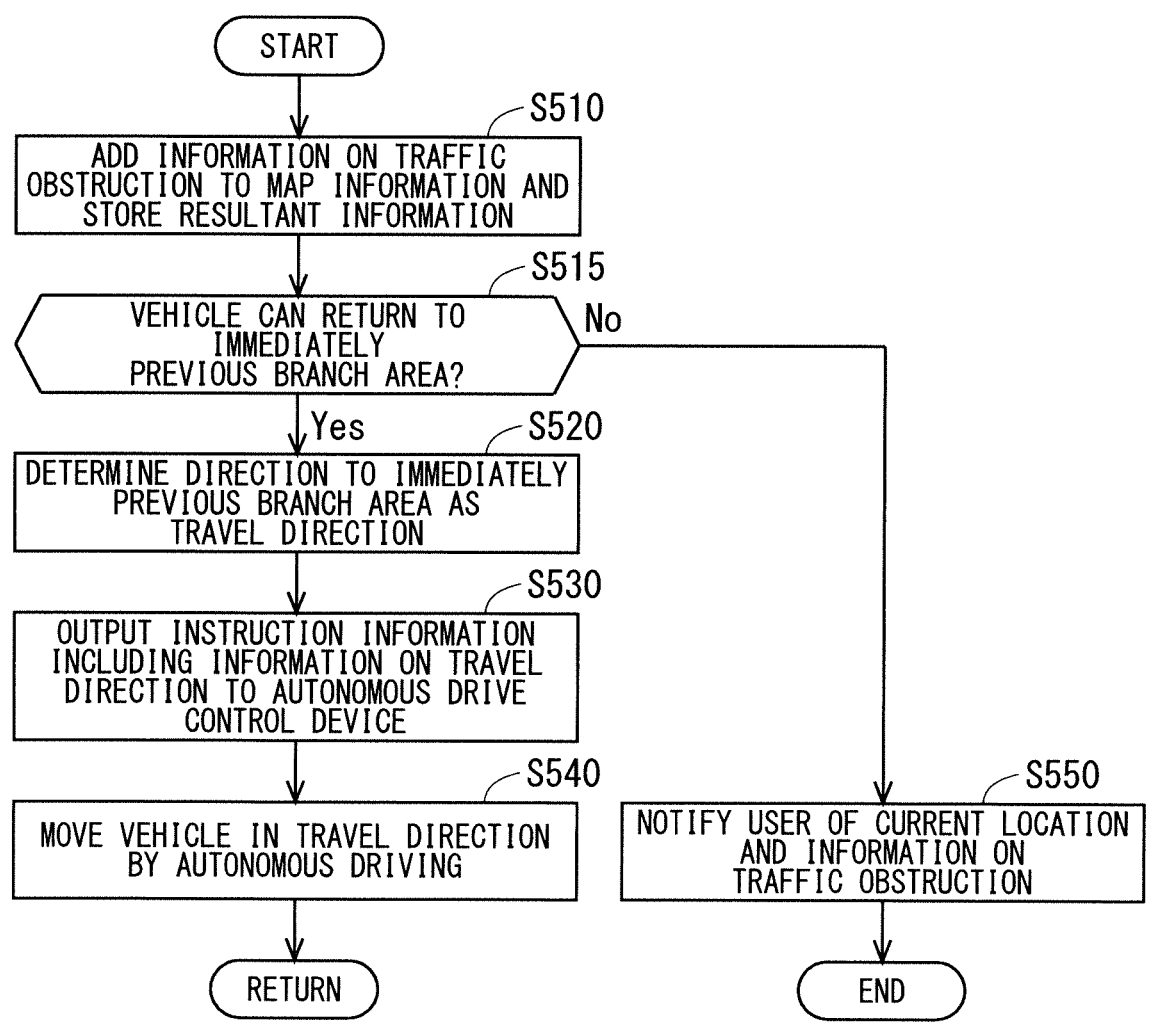
FIG. 38 is a flowchart illustrating details of processing for determining a traffic obstruction according to Embodiment 8.

FIG. 38 is a flowchart illustrating the details of the processing for determining a traffic obstruction according to Embodiment 8.

Step S510 is the same as step S510 illustrated in FIG. 36.

In step S515, the travel-direction determiner 10 determines whether or not the vehicle 1 can travel in the direction returning to the immediately previous branch area 5. For example, the camera-information acquirer 40 extracts information on the traffic regulations 9 at the current location and information on the traffic obstruction on the basis of marking or signs included in an image of a scene forward or backward of the vehicle 1, captured by the camera 111. The travel-direction determiner 10 determines whether or not the vehicle 1 can travel in the direction returning to the previous branch area 5, on the basis of the information on the traffic regulations 9 and the information on the traffic obstruction acquired by the camera-information acquirer 40. If the vehicle 1 can travel in the direction returning to the immediately previous branch area 5, step S520 is executed. If the vehicle 1 cannot travel in the direction returning to the immediately previous branch area 5, step S550 is executed.

Steps S520 to S540 are the same as those illustrated in FIG. 36.

In step S550, the communicator 30 notifies the user of the current location of the vehicle 1 and the information on the traffic obstruction. For example, the communicator 30 may add the current location of the vehicle 1 and the location of the traffic obstruction to the map information on the travel path and notifies the user of the obtained information. The user terminal 130 displays the current location of the vehicle 1 and the location of the traffic obstruction on the map of the travel path similar to the map information illustrated in FIG. 30.

To summarize the above description, the autonomous drive instruction device according to Embodiment 8 further includes the communicator 30 that notifies the user of the information on the traffic obstruction and the current location of the vehicle 1 stopping due to the traffic obstruction that disables the passage of the vehicle 1.

By notifying the user of, for example, the information on the current location and the information on the traffic obstruction under circumstances that the vehicle 1 cannot travel, the autonomous drive instruction device avoids a situation in which the user is unable to grasp conditions of the hang-up vehicle 1. This notification eliminates feelings of anxiety or discontent of the user. This notification may also enable the user to determine to continue to wait for at the designated location 4 or determine to move to the hang-up vehicle 1 for boarding.

Variation of Embodiment 8

The autonomous drive instruction device according to Embodiment 8 performs processing for causing the vehicle 1 to return to the immediately previous branch area 5 during the processing for determining a traffic obstruction, when permitted by the traffic regulations 9. However, there are cases in which there are no more paths navigable by the vehicle 1 due to traffic obstructions in the branch area 5 to which the vehicle 1 has returned. An autonomous drive instruction device according to a variation of Embodiment 8 can cope with such a saturation.

Operations of the autonomous drive instruction device and an autonomous drive instruction method according to the variation of Embodiment 8 differ in those of Embodiment 7 in the details of the processing for re-determining a travel direction in step S60 illustrated in FIG. 35.

Figure 39:
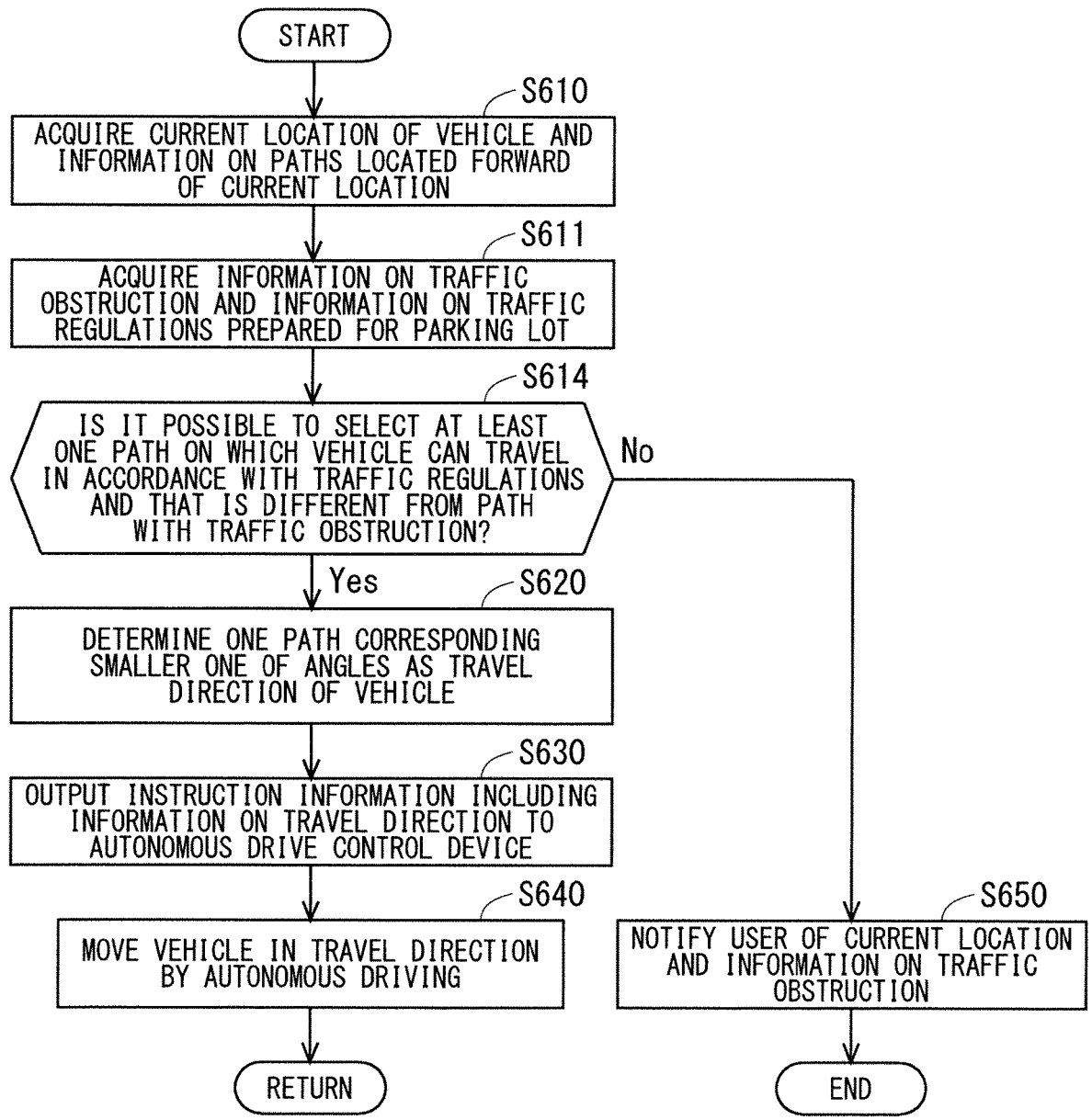
FIG. 39 is a flowchart illustrating details of processing for re-determining a travel direction according to a variation of Embodiment 8.

FIG. 39 is a flowchart illustrating the details of the processing for re-determining a travel direction according to the variation of Embodiment 8.

Steps S610 and S611 are the same as those illustrated in FIG. 37.

In step S614, the travel-direction determiner 10 determines whether or not it is possible to select at least one path on which the vehicle 1 can travel in accordance with the traffic regulations 9 and each of which is a different path from the path with the traffic obstruction. If it is possible to select at least one path, step S620 is executed. If it is impossible to select at least one path, step S650 is executed.

Steps S620 to S640 are the same as those illustrated in FIG. 37.

In step S650, the communicator 30 notifies the user of the current location and the information on the traffic obstruction. For example, the communicator 30 may add the current location of the vehicle 1 and the location of the traffic obstruction to the map information on the travel path, and notifies the user of resultant map information. The user terminal 130 displays the current location of the vehicle 1 and the location of the traffic obstruction on the map of the travel path similar to the map information illustrated in FIG. 30.

By notifying the user of the information on the current location and the information on the traffic obstruction under circumstances that the vehicle 1 cannot travel, the autonomous drive instruction device according to the variation of Embodiment 8 also avoids a saturation where the user cannot grasp conditions of the hang-up vehicle 1. This notification eliminates feelings of anxiety or discomfort of the user. This notification may also enable the user to determine to continue to wait for at the designated location 4 or determine to move to the location of the hang-up vehicle 1 for boarding.

Embodiment 9

An autonomous drive instruction device and an autonomous drive instruction method according to Embodiment 9 will be described. Embodiment 9 is a subordinate concept of Embodiment 1, and the autonomous drive instruction device according to Embodiment 9 includes each constituent element of the autonomous drive instruction device 100 according to Embodiment 1. Note that descriptions of constituent elements and operations that are similar to those of any of Embodiments 1 to 8 shall be omitted.

Figure 40:
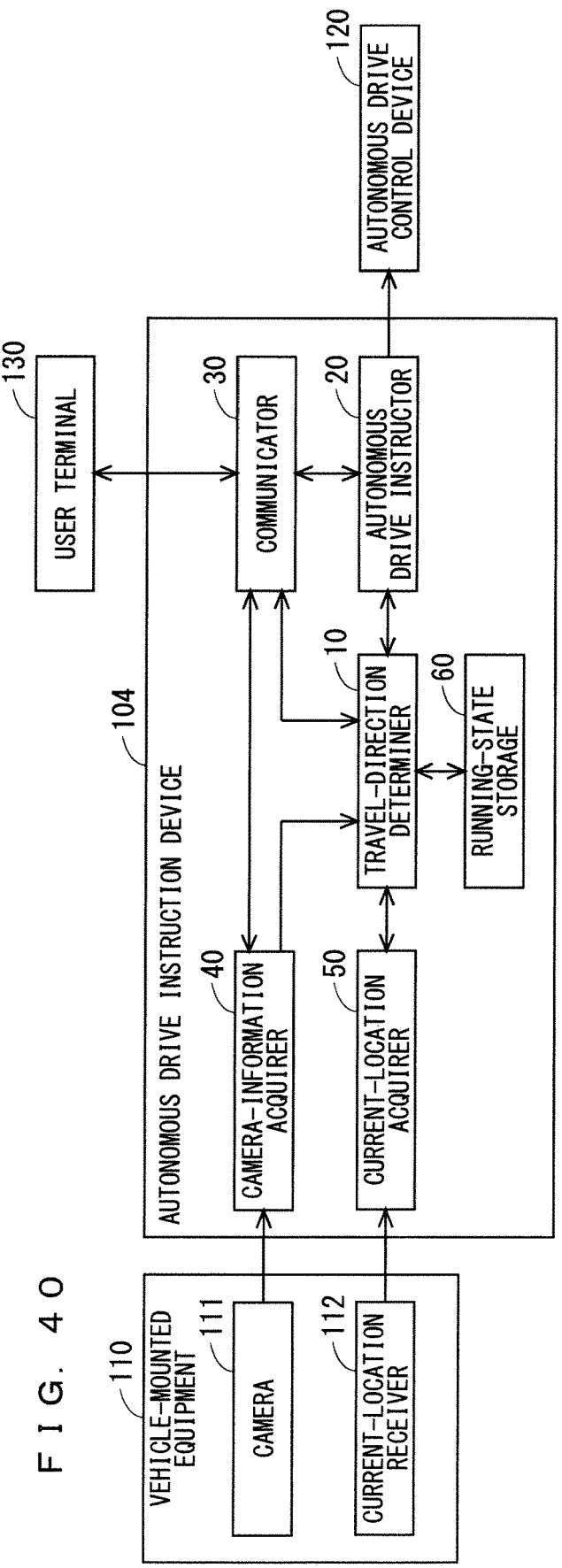
FIG. 40 is a block diagram illustrating a configuration of an autonomous drive instruction device according to Embodiment 9.

FIG. 40 is a block diagram illustrating a configuration of an autonomous drive instruction device 104 according to Embodiment 9.

The running-state storage 60 corrects information on a traffic obstruction added to the travel path, on the basis of information transmitted from the user and indicating the removal of the traffic obstruction. For example, the running-state storage 60 deletes the information on the traffic obstruction on the basis of the information indicating the removal of the traffic obstruction. By correcting the information on the traffic obstruction, the travel-direction determiner 10 can also determine the path from which the traffic obstruction has been removed, as the travel direction.

Figure 41:
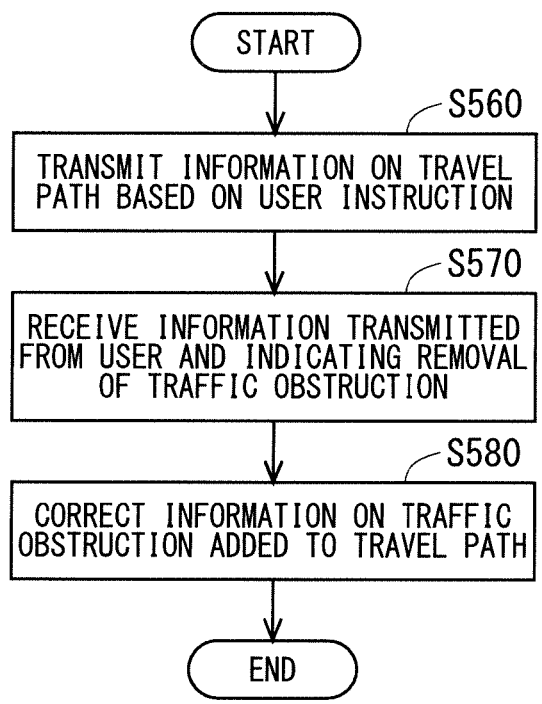
FIG. 41 is a flowchart illustrating details of processing for determining a traffic obstruction according to Embodiment 9.

FIG. 41 is a flowchart illustrating details of processing for removing a traffic obstruction according to Embodiment 9. For example, the user who has received the notification through execution of step S550 in FIG. 38 transmits a user instruction to transmit information on the travel path to the user terminal 130, to the autonomous drive instruction device 104.

In step S560, the communicator 30 transmits the information on the travel path to the user terminal 130 in accordance with the user instruction. For example, the communicator 30 transmits map information obtained by adding the information on the traffic obstruction to the map information stored in step S510, as the information on the travel path to the user terminal 130. The map shows the location where the traffic obstruction has occurred. When the user has checked the location of the traffic obstruction on the map and determined that the traffic obstruction has already been removed, information indicating the removal of the traffic obstruction is transmitted via the user terminal 130.

In step S570, the communicator 30 receives the information indicating the removal of the traffic obstruction, transmitted from the user.

In step S580, the running-state storage 60 corrects the information on the traffic obstruction added to the travel path. For example, the running-state storage 60 deletes the information on the traffic obstruction from the map information.

Thereafter, for example, the autonomous drive instruction and the autonomous drive control to the designated location 4, such as step 30 illustrated in FIG. 35, are executed again.

To summarize the above description, the autonomous drive instruction device 104 according to Embodiment 9 includes the running-state storage 60. The running-state storage 60 stores the travel path that is the path on which the vehicle travels from the parking entrance 2A to the parking location 3, and the information on the traffic obstruction that disables the passage of the vehicle 1 on one path. The running-state storage 60 also corrects a record of the information on the traffic obstruction on the basis of the information indicating the removal of the traffic obstruction, transmitted from the user.

This autonomous drive instruction device 104 makes it possible to determine the path from which the traffic obstruction has been removed, as the travel direction in the processing for determining a travel direction.

Embodiment 10

An autonomous drive instruction device and an autonomous drive instruction method according to Embodiment 10 will be descried. Embodiment 10 is a subordinate concept of Embodiment 1, and the autonomous drive instruction device according to Embodiment 10 includes each constituent element of the autonomous drive instruction device 100 according to Embodiment 1. Note that descriptions of constituent elements and operations that are similar to those of any of Embodiments 1 to 9 shall be omitted.

In the case where the designated location is updated to a new designated location 4 by the user during travel of the vehicle 1 on one path, the travel-direction determiner 10 determines a new one of the plurality of paths 6 as the travel direction of the vehicle 1 on the basis of the new designated location 4 and the information on the plurality of paths 6. This function of the travel-direction determiner 10 is implemented by the processor 91 illustrated n FIG. 3 or 6 executing programs stored in the memory 92.

Figure 42:
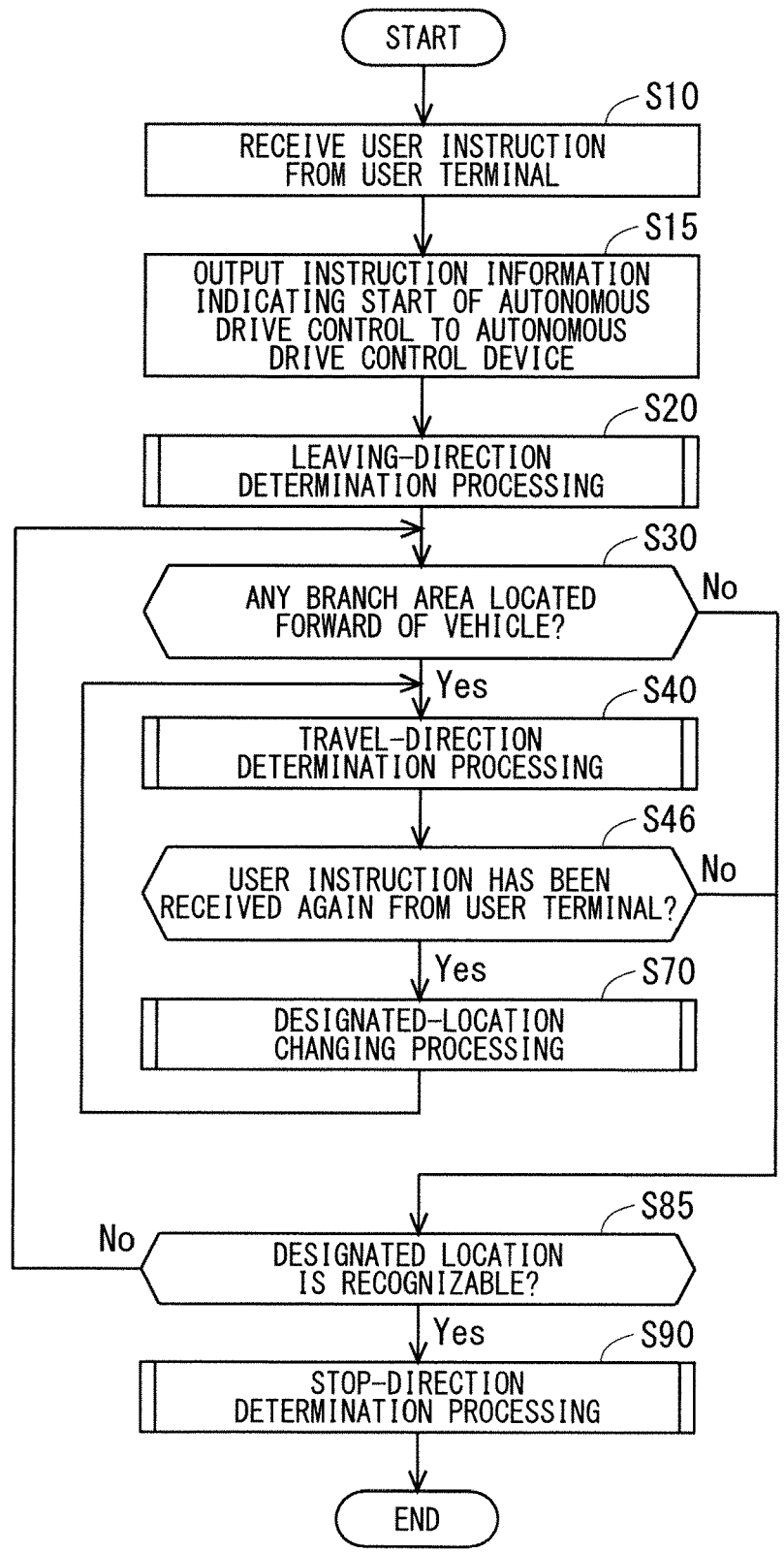
FIG. 42 is a flowchart illustrating operations of an autonomous drive instruction device and an autonomous drive instruction method according to Embodiment 10.

FIG. 42 is a flowchart illustrating operations of the autonomous drive instruction device and the autonomous drive instruction method according to Embodiment 10.

Steps S10 to step S40 are the same as those illustrated in FIG. 33.

In step S46, the travel-direction determiner 10 determines whether or not a user instruction has been received again from the user terminal 130. If a user instruction has been received again, step S70 is executed. If no user instruction has been received again, step S85 is executed.

In step S70, processing for changing a designated location is executed. Details thereof will be described later.

The subsequent steps including step S85 are the same as those illustrated in FIG. 33.

Figure 43:
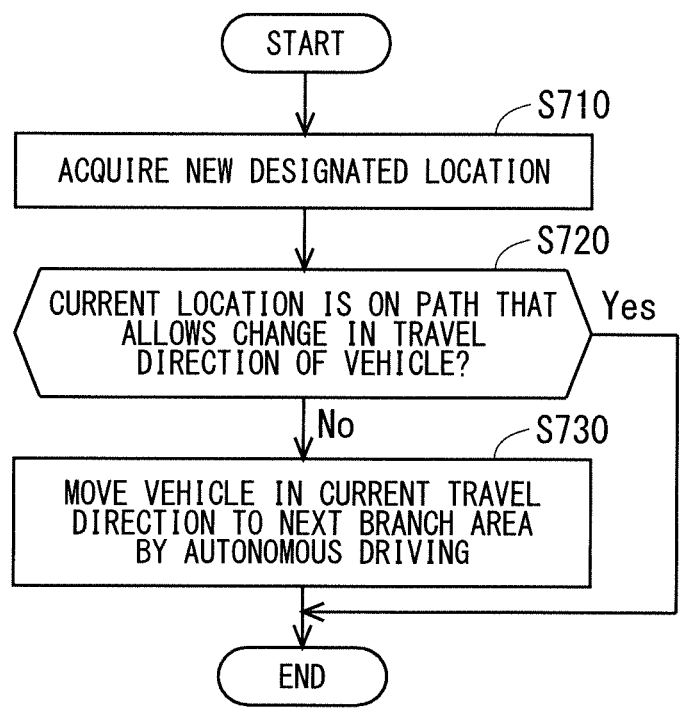
FIG. 43 is a flowchart illustrating details of processing for changing a designated location according to Embodiment 10.

FIG. 43 is a flowchart illustrating the details of the processing for changing a designated location according to Embodiment 10.

In step S710, the travel-direction determiner 10 acquires the new designated location 4 via the communicator 30. The new designated location 4 is designated by the user and included in the user instruction. For example, when the designated location 4 corresponds to the location of the user terminal 130 carried by the user, the new designated location 4 is a location after the user has moved.

In step S720, the travel-direction determiner 10 determines whether or not the current location is on the path on which the vehicle 1 can change its travel direction. The path on which the vehicle can change its travel direction refers to the case where the path has enough space for the vehicle 1 to change its direction. If the path allows a change in the travel direction, the processing for changing a designated location ends. Then, the processing for determining a travel direction in step S40 is executed again. If the path does not allow a change in the travel direction, step S730 is executed.

In step S730, the autonomous drive control device 120 moves the vehicle 1 to the next branch area 5 in the current travel direction by autonomous driving. In this way, the processing for changing a designated location ends, and the processing for determining a travel direction in step S40 is executed again.

To summarize the above description, in the case where the designated location 4 is updated to a new designated location 4 by the user during travel of the vehicle 1 on one path, the travel-direction determiner 10 of the autonomous drive instruction device according to Embodiment 10 determines another new one of the plurality of paths 6 as the travel direction of the vehicle 1 on the basis of the new designated location 4 and the information on the plurality of paths 6.

For example, if the vehicle 1 has arrived late at the designated location due to a traffic jam in the parking lot or the like, it is conceivable that the user may change the designated location 4. For example, the user may approach the vehicle 1 while searching for the vehicle 1. Even in that case, the autonomous drive instruction device according to Embodiment 10 enables re-stetting of the travel direction so as to allow the vehicle 1 to arrive at the new designated location 4.

Embodiment 11

An autonomous drive instruction device and an autonomous drive instruction method according to Embodiment 11 will be described. Embodiment 11 is a subordinate concept of Embodiment 1, and the autonomous drive instruction device according to Embodiment 11 includes each constituent element of the autonomous drive instruction device 100 according to Embodiment 1. Note that descriptions of constituent elements and operations that are similar to those of any of Embodiments 1 to 10 shall be omitted.

Figure 44:
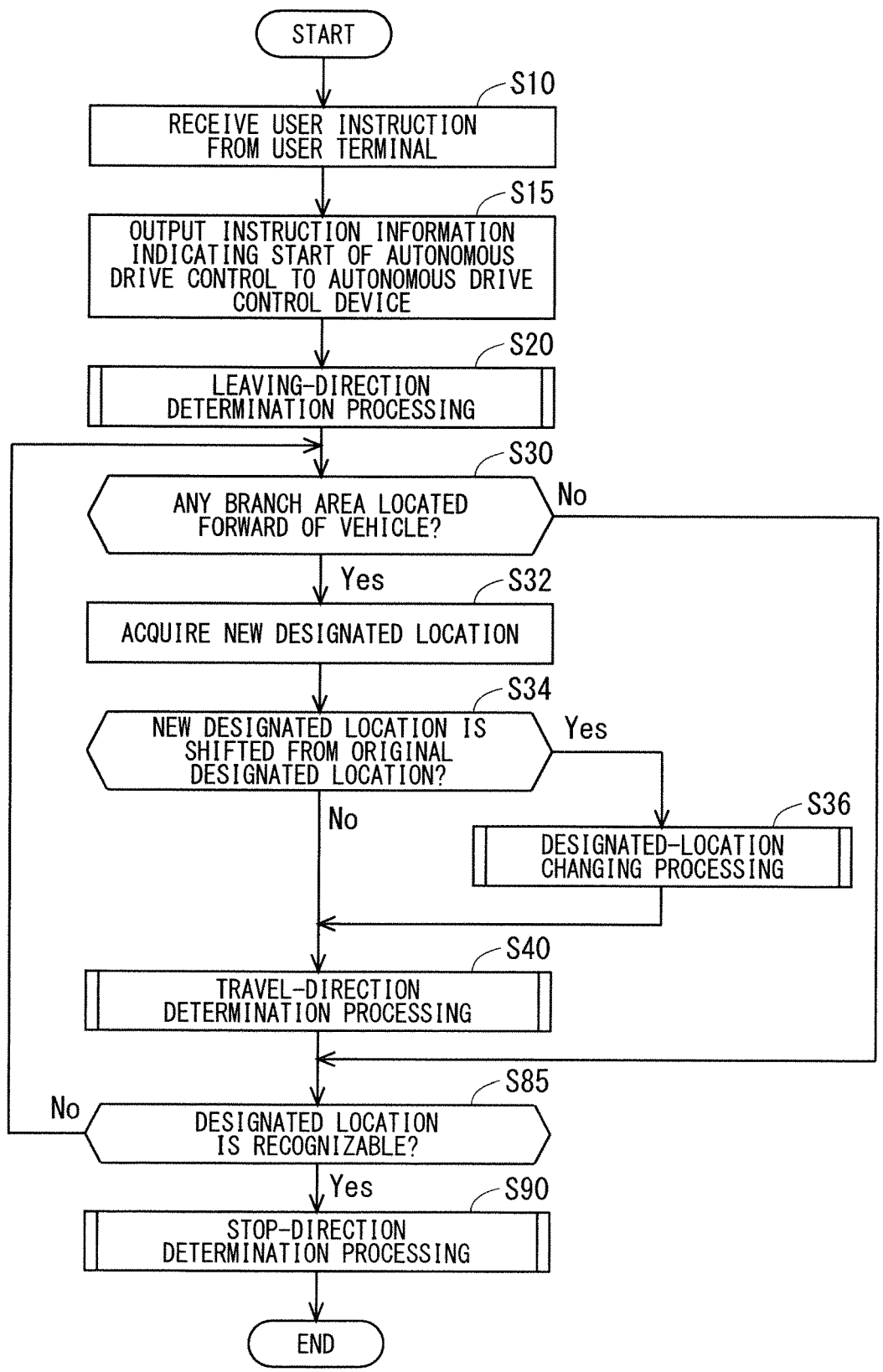
FIG. 44 is a flowchart illustrating operations of an autonomous drive instruction device and an autonomous drive instruction method according to Embodiment 11.

FIG. 44 is a flowchart illustrating operations of the autonomous drive instruction device and the autonomous drive instruction method according to Embodiment 11.

Steps S10 to S30 are the same as those illustrated in FIG. 33.

In step S32, the travel-direction determiner 10 acquires the new designated location 4 via the communicator 30. The new designated location 4 is designated by the user and included in the user instruction. For example, in the case where the designated location 4 is the location of the user terminal 130 carried by the user, the new designated location 4 is a location after the user has moved.

In step S34, the travel-direction determiner 10 determines whether or not the new designated location 4 is shifted from the original designated location. If the new designated location 4 is not shifted from the original designated location, step S40 is executed. If the new designated location 4 is shifted from the original designated location, step S36 is executed.

In step S36, processing for changing a designated location is executed. Details thereof will be described later.

The subsequent steps including step S40 are the same as those illustrated in FIG. 33.

Figure 45:
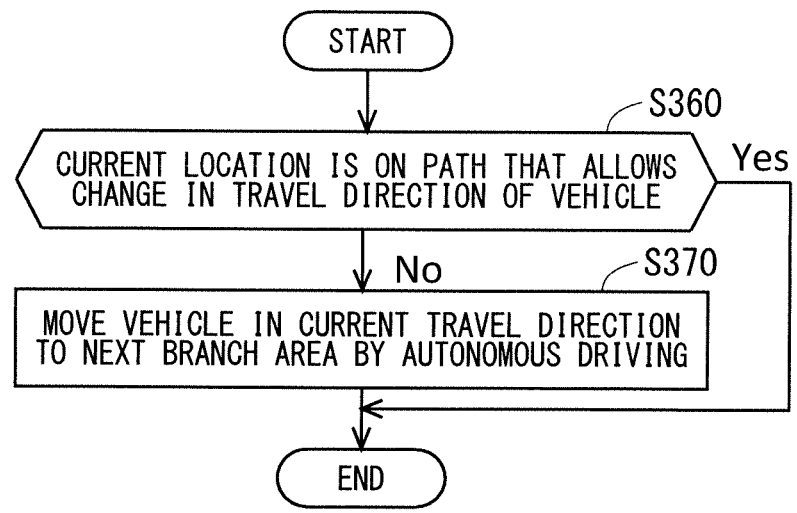
FIG. 45 is a flowchart illustrating details of processing for changing a designated location according to Embodiment 11.

FIG. 45 is a flowchart illustrating the details of the processing for changing a designated location according to Embodiment 11.

In step S360, the travel-direction determiner 10 determines whether or not the current location is on the path on which the vehicle 1 can change its travel direction. The path on which the vehicle can change its travel direction refers to the case where the path has enough space for the vehicle 1 to change its direction. If the path allows a change in the travel direction, the processing for changing a designated location ends, and the processing for determining a travel direction in step S40 is executed. If the path does not allow a change in the travel direction, step S370 is executed.

In step S370, the autonomous drive control device 120 causes the vehicle 1 to move to the next branch area 5 in the current travel direction by autonomous driving. Then, the processing for changing a designated location ends, and step S40 is executed.

Even if the user has changed the designated location 4, the autonomous drive instruction device according to Embodiment 11 makes it possible to re-determine the travel direction so that the vehicle 1 can arrive at the new designated location 4.

Embodiment 12

The autonomous drive instruction devices described above in the embodiments are also applicable to a system constructed by appropriately combining the functions of a navigation device, a communication terminal, a server, and applications installed in these units. The navigation device as used herein includes, for example, a portable navigation device (PND). The communication terminal includes, for example, portable terminals such as a mobile phone, a smartphone, and a tablet.

Figure 46:
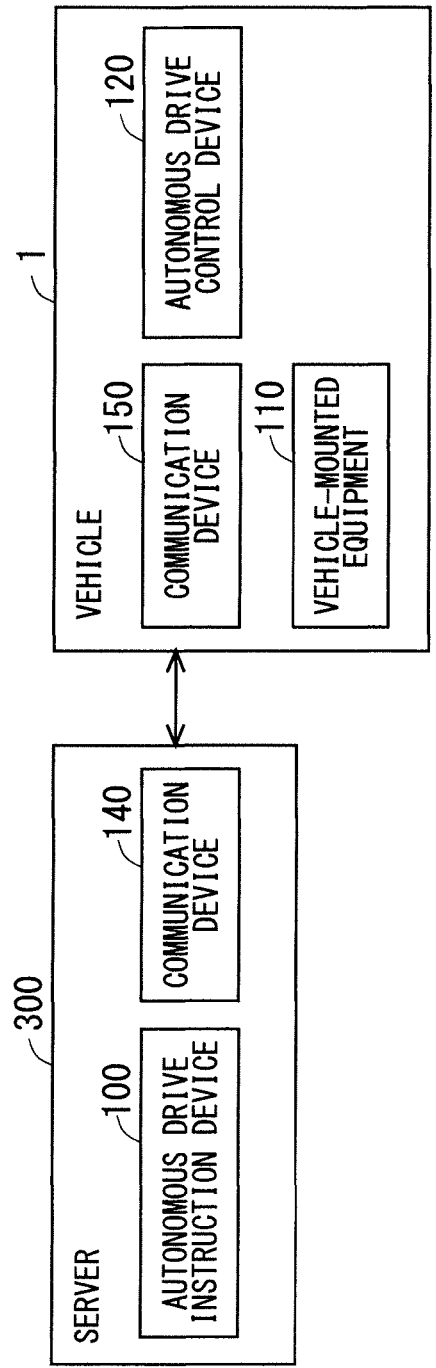
FIG. 46 is a block diagram illustrating configurations of an autonomous drive instruction device according to Embodiment 12 and devices that operate in relation to the autonomous drive instruction device.

FIG. 46 is a block diagram illustrating configurations of an autonomous drive instruction device 100 according to Embodiment 12 and devices that operate in relation to the autonomous drive instruction device.

The autonomous drive instruction device 100 and a communication device 140 are provided in a server 300. The autonomous drive instruction device 100 acquires the designated location 4 and information on the plurality of paths 6 via the communication device 140 and a communication device 150 of vehicle-mounted equipment 110 provided in a vehicle 1. The autonomous drive instruction device 100 outputs instruction information including information on the travel direction to an autonomous drive control device 120 provided in the vehicle 1 via each communication device.

By arranging the autonomous drive instruction device 100 in the server 300 in this way, it is possible to simplify the configurations of devices mounted on the vehicle 1.

Alternatively, the functions and constituent elements of the autonomous drive instruction device 100 may be arranged in a distributed manner, such as arranging part of the function or some of the constituent elements in the server 300 and arranging the other part of the function or the other constituent elements in the vehicle 1.

It should be noted that the present invention can be implemented by freely combining each of the embodiments or by making a modification or omission on the embodiments as appropriate without departing from the scope of the present invention.

While the invention has been shown and described in detail, the foregoing description is in all aspects illustrative and not restrictive. It is therefore to be understood that numerous modifications and variations can be devised without departing from the scope of the invention.

EXPLANATION OF REFERENCE SIGNS

1: vehicle, 3: parking location, 4: designated location, 5: branch area, 6: path, 8: designated-location direction, 9; traffic regulations, 10: travel-direction determiner, 11: approach path, 20: autonomous drive instructor, 30: communicator, 40: camera-information acquirer, 50: current-location acquirer, 60: running-state storage, 100: autonomous drive instruction device, 101: autonomous drive instruction device, 102: autonomous drive instruction device, 103: autonomous drive instruction device, 104: autonomous drive instruction device, 110: vehicle-mounted equipment, 111: camera, 112: current-location receiver, 120: autonomous drive control device, 130: user terminal.

The invention claimed is:

1. An autonomous drive instruction device comprising:
   a processor, and
   a memory storing a program which, when executed, causes the processor to perform a process for outputting instruction information controlling an autonomous driving vehicle to move from a parking location to a designated location in a parking lot by autonomous driving, the parking lot including a branch area that is located forward of a current location of the vehicle while the vehicle travels from the parking location to the designated location by an instruction of a user, the branching area branching out and connecting into a plurality of paths navigable by the vehicle, the process comprising:
      determining, in response to recognition of the plurality of paths in the branch area, and without a map for navigation of the parking lot, one path from among the plurality of paths as a next travel direction to be traveled by the vehicle on the basis of the designated location and information on the recognized plurality of paths, the plurality of paths being recognized forward of the current location of the vehicle via at least one of a vehicle-mounted camera and a vehicle-mounted global navigation satellite system (GNSS) receiver, the one path being determined as the one of the plurality of paths corresponding to an extension direction that forms a smaller angle among a plurality of angles formed by a plurality of extension directions and a designated-location direction, the plurality of extension directions being directions of extension of the plurality of paths from the branch area, the designated-location direction being a direction in a straight line from the branch area to the designated location, and
      controlling, on the basis of the instruction information including information on the travel direction, the vehicle to move in the travel direction by the autonomous driving.

2. The autonomous drive instruction device according to claim 1, wherein the process includes
   selecting at least one path navigable by the vehicle in accordance with a traffic regulation from among the plurality of paths, on the basis of the information on the plurality of paths and information on the traffic regulation on the plurality of paths, the traffic regulation being prepared for the parking lot and recognized via the at least one of the vehicle-mounted camera and the vehicle-mounted GNSS receiver,
   the one path being included in the at least one path navigable by the vehicle.

3. The autonomous drive instruction device according to claim 1, further comprising:
   a running-state memory that stores an approach path and information on a traffic regulation on the approach path, the approach path being a path located in front of the parking location and on which the vehicle travels when entering the parking lot, the traffic regulation being prepared for the parking lot and recognized via the at least one of the vehicle-mounted camera and the vehicle-mounted GNSS receiver of the vehicle travelling on the approach path, wherein
   when the vehicle leaves the parking location and when it is determined, on the basis of the approach path and information on the traffic regulation on the approach path, that the vehicle is capable of leaving for the same path as the approach path in accordance with the traffic regulation, the process determines the approach path as the one path that is the travel direction of the vehicle.

4. The autonomous drive instruction device according to claim 1, further comprising:
   a running-state memory that stores an approach path and information on a traffic regulation on the approach path, the approach path being a path on which the vehicle travels from an entrance of the parking lot to the parking location when entering the parking location, and the traffic regulation being prepared for the parking lot and recognized via the at least one of the vehicle-mounted camera and the vehicle-mounted GNSS receiver of the vehicle travelling on the approach path, wherein
   the process selects at least one path navigable by the vehicle in accordance with the traffic regulations from among the plurality of paths, on the basis of the information on the plurality of paths, the approach path, and information on the traffic regulation on the approach path, and
   the one path is included in the at least one path navigable by the vehicle.

5. The autonomous drive instruction device according to claim 1, wherein the process includes:
   determining a stop direction of the vehicle at the designated location on the basis of a designated stop direction and information on a traffic regulation on the designated location, the designated stop direction being designated by the user, the traffic regulation being prepared for the parking lot and recognized via the at least one of the vehicle-mounted camera and the vehicle-mounted GNSS receiver of the vehicle travelling in front of the designated location, and
   controlling, on the basis of the instruction information including information on the stop direction, the autonomous driving vehicle to stop at the designated location in the stop direction.

6. The autonomous drive instruction device according to claim 5, wherein
   when the designated stop direction is not designated by the user, the process sets a direction in which the vehicle is parked on a left side of the designated location as the designated stop direction.

7. The autonomous drive instruction device according to claim 1, wherein
   when there are one or more traffic obstructions that disable travel of the vehicle on the one path, the process determines a direction returning to the branch area in which the one path has been determined as the travel direction, as the travel direction of the vehicle, and
   among the plurality of paths in the branch area to which the vehicle has returned, the process determines a path other than the one path with the traffic obstruction as the travel direction of the vehicle.

8. The autonomous drive instruction device according to claim 7, further comprising:
   a running-state memory that stores a travel path and information on the traffic obstruction that disables travel of the vehicle on the one path, the travel path being a path on which the vehicle travels from an entrance of the parking lot to the parking location, wherein the process corrects a record of the information on the traffic obstruction stored in the running-state memory on the basis of information transmitted from the user and indicating removal of the traffic obstruction.

9. The autonomous drive instruction device according to claim 1, wherein the process includes
notifying the user of information on a traffic obstruction that disables travel of the vehicle and the current location of the vehicle stopping on the one path due to the traffic obstruction.

10. The autonomous drive instruction device according to claim 1, wherein
when the designated location is updated to a new designated location by the user during travel of the vehicle on the one path, the process determines a new one path among the plurality of paths as the travel direction of the vehicle on the basis of the new designated location and the information on the plurality of paths.

11. The autonomous drive instruction device according to claim 1, wherein the determining of the one path as the next travel direction is performed while the vehicle is autonomously driving on a previously determined path.

12. A method for outputting instruction information controlling an autonomous driving vehicle to move from a parking location to a designated location in a parking lot by autonomous driving, the parking lot including a branch area that is located forward of a current location of the vehicle while the vehicle travels from the parking location to the designated location by an instruction of a user, the branching area branching out and connecting into a plurality of paths navigable by the vehicle, the method comprising:
determining, in response to recognition of the plurality of paths in the branch area, and without a map for navigation of the parking lot, one path from among the plurality of paths as a next travel direction to be traveled by the vehicle on the basis of the designated location and information on the recognized plurality of paths, the plurality of paths being recognized forward of the current location of the vehicle via at least one of a vehicle-mounted camera and a vehicle-mounted global navigation satellite system (GNSS) receiver, the one path being determined as the one of the plurality of paths corresponding to an extension direction that forms a smaller angle among a plurality of angles formed by a plurality of extension directions and a designated-location direction, the plurality of extension directions being directions of extension of the plurality of paths from the branch area, the designated-location direction being a direction in a straight line from the branch area to the designated location; and
controlling, on the basis of the instruction information including information on the travel direction, the autonomous driving vehicle to move in the travel direction by the autonomous driving.

13. The method according to claim 11, wherein the determining of the one path as the next travel direction is performed while the vehicle is autonomously driving on a previously determined path.

* * * * *